United States Patent
Latheef et al.

(10) Patent No.: US 11,399,326 B2
(45) Date of Patent: Jul. 26, 2022

(54) METHODS AND SYSTEMS FOR HANDLING CONDITIONAL HANDOVER (CHO) IN A WIRELESS COMMUNICATION NETWORK

(71) Applicant: Samsung Electronics Co., Ltd., Suwon-si (KR)

(72) Inventors: Fasil Abdul Latheef, Bangalore (IN); Mangesh Abhimanyu Ingale, Bangalore (IN); Himke Van Der Velde, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 16/989,135

(22) Filed: Aug. 10, 2020

(65) Prior Publication Data

US 2021/0051550 A1    Feb. 18, 2021

(30) Foreign Application Priority Data

Aug. 12, 2019 (IN) .............................. 201941032619
Aug. 7, 2020 (IN) .............................. 2019 41032619

(51) Int. Cl.
*H04W 36/08* (2009.01)
*H04L 41/0816* (2022.01)
(Continued)

(52) U.S. Cl.
CPC ......... *H04W 36/08* (2013.01); *H04L 41/0816* (2013.01); *H04W 36/0005* (2013.01); *H04W 36/04* (2013.01)

(58) Field of Classification Search
CPC ............. H04W 36/0005; H04W 36/04; H04W 36/0836; H04L 41/0816
See application file for complete search history.

(56) References Cited

U.S. PATENT DOCUMENTS

2014/0226621 A1*  8/2014  Choi ................. H04W 36/0061
                                                           370/331
2017/0055187 A1*  2/2017  Kang ................ H04W 36/0058
(Continued)

FOREIGN PATENT DOCUMENTS

KR    10-2018-0122963 A    11/2018
KR    10-2019-0087299 A     7/2019
(Continued)

OTHER PUBLICATIONS

H. Martikainen, I. Viering, A. Lobingerand T. Jokela, "On the Basics of Conditional Handover for 5G Mobility," 2018 IEEE 29th Annual International Symposium on Personal, Indoorand Mobile Radio Communications (PIMRC), 2018, pp. 1-7, doi: 10.1109/PIMRC.2018.8580946. (Year: 2018).*

(Continued)

*Primary Examiner* — Chi H Pham
*Assistant Examiner* — Vladislav Y Agureyev
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure provides methods and devices for handling conditional handover (CHO) in a wireless communication network.

16 Claims, 20 Drawing Sheets

(51) Int. Cl.
  *H04W 36/04* (2009.01)
  *H04W 36/00* (2009.01)

(56) References Cited

U.S. PATENT DOCUMENTS

| | | | |
|---|---|---|---|
| 2018/0279186 A1* | 9/2018 | Park | H04W 36/30 |
| 2018/0279193 A1* | 9/2018 | Park | H04W 36/08 |
| 2019/0223057 A1 | 7/2019 | Park et al. | |
| 2019/0223073 A1* | 7/2019 | Chen | H04W 76/27 |
| 2019/0281511 A1* | 9/2019 | Susitaival | H04W 36/36 |
| 2019/0380066 A1* | 12/2019 | Sharma | H04W 36/14 |
| 2019/0380081 A1* | 12/2019 | Chang | H04W 36/0072 |
| 2019/0387438 A1* | 12/2019 | Chang | H04W 36/36 |
| 2019/0394084 A1* | 12/2019 | Tsai | H04L 47/27 |
| 2020/0008113 A1* | 1/2020 | Chen | H04W 36/0069 |
| 2020/0053601 A1* | 2/2020 | Wu | H04W 36/0055 |
| 2020/0077314 A1 | 3/2020 | Hwang et al. | |
| 2020/0351694 A1* | 11/2020 | Chen | H04W 36/36 |
| 2020/0351734 A1* | 11/2020 | Purkayastha | H04W 36/0058 |
| 2020/0413392 A1* | 12/2020 | Purkayastha | H04W 36/08 |
| 2021/0022055 A1* | 1/2021 | Tseng | H04W 24/10 |
| 2021/0045093 A1* | 2/2021 | Rao | H04W 72/04 |
| 2021/0058836 A1* | 2/2021 | Kimba Dit Adamou | H04W 36/0058 |
| 2021/0068016 A1* | 3/2021 | Shi | H04W 36/08 |
| 2021/0076271 A1* | 3/2021 | Jokela | H04W 36/36 |
| 2021/0297907 A1* | 9/2021 | Jokela | H04W 36/0083 |
| 2021/0360495 A1* | 11/2021 | Lovlekar | H04W 36/08 |

FOREIGN PATENT DOCUMENTS

| | | | | |
|---|---|---|---|---|
| WO | WO-2014124682 A1 * | 8/2014 | | H04L 5/0044 |
| WO | WO-2018113655 A1 * | 6/2018 | | H04W 36/36 |
| WO | 2019/138155 A1 | 7/2019 | | |
| WO | WO-2019158801 A1 * | 8/2019 | | H04W 36/0072 |
| WO | WO-2019195060 A1 * | 10/2019 | | H04W 36/305 |
| WO | WO-2020188447 A1 * | 9/2020 | | H04W 36/0083 |
| WO | WO-2020222271 A1 * | 11/2020 | | H04W 36/38 |
| WO | WO-2020259836 A1 * | 12/2020 | | H04W 36/0083 |

OTHER PUBLICATIONS

H.-S. Park, Y. Lee, T.-J. Kim, B.-C. Kim and J.-Y. Lee, "Handover Mechanism in NR for Ultra-Reliable Low-Latency Communications," in IEEE Network, vol. 32, No. 2, pp. 41-47, Mar.-Apr. 2018, doi: 10.1109/MNET.2018.1700235. (Year: 2018).*
Indian Office Action dated Sep. 1, 2021, issued in Indian Patent Application No. 201941032619.
Qualcomm Incorporated, LTE Conditional HO design considerations, R2-1904662, 3GPP TSG RAN WG2 #105b, Xian, China, Mar. 29, 2019, pp. 1-9 and figure 1.
Huawei, Support of CHO, R3-192665, 3GPP TSG RAN WG3 #104, Reno, USA, May 3, 2019, pp. 1-13 and figure 8.2.z.2-1.
Ericsson, Suspend while monitoring CHO in NR, R2-1903521, 3GPP TSG RAN WG2 #105b, Xian, China, Mar. 28, 2019, pp. 1-5.
Intel Corporation, Consideration on NR conditional HO, R3-192712, 3GPP TSG RAN WG3 #104, Reno, USA, May 3, 2019, pp. 1-5.
International Search Report dated Nov. 6, 2020, issued in International Application No. PCT/KR2020/010618.
Extended European Search Report dated Jan. 18, 2022, issued in a counterpart European Application No. 20852562.6.
Ericsson: "Conditional Handover for E-UTRAN—HO preparation", 3GPP Draft; R3-193030—Conditional Handover for E-UTRAN—HO Preparation, 3rd Generation Partnership Project (3GPP), Mobile Competence Centre ; 650, Route Des Lucioles ; F-06921 Sophia-Antipolis Cede vol. RAN WG3, No. XP051732291; May 13, 2019, Reno, NV, USA.
Huawei et al.: "Considerations on modification of CHO configurations by RRC signalling", 3GPP Draft; R2-1907672—Considerations On Modification of CHO Configurations by RRC Signalling, 3rd Generation Partnership Project (3GPP), Mobile Competence Centre ; 650, Route Des Lucioles ; F-06921 S vol. RAN WG2, No. XP051731106; May 13, 2019, Reno, Nevada, USA.

* cited by examiner

FIG. 10B

```
RRCReconfigurationComplete ::= SEQUENCE {
rrc-TransactionIdentifier        RRC-TransactionIdentifier,
criticalExtensions               CHOICE {
rrcReconfigurationCompleteRRCReconfigurationComplete-IEs,
criticalExtensionsFuture         SEQUENCE {}
    }
}
RRCReconfigurationComplete-IEs ::=   SEQUENCE {
lateNonCriticalExtension                 OCTET STRING        OPTIONAL,
nonCriticalExtensionRRCReconfigurationComplete-v1530-IEs  OPTIONAL
}
RRCReconfigurationComplete-v1530-IEs ::=          SEQUENCE {
uplinkTxDirectCurrentListUplinkTxDirectCurrentList     OPTIONAL,
nonCriticalExtension  RRCReconfigurationComplete-v1560-IEs  OPTIONAL
}
RRCReconfigurationComplete-v1560-IEs ::=  SEQUENCE {
scg-Response                             CHOICE {
nr-SCG-Response                          OCTET STRING,
eutra-SCG-Response                       OCTET STRING
}                                        OPTIONAL,
nonCriticalExtension  RRCReconfigurationComplete-v16xy-IEs  OPTIONAL
}
RRCReconfigurationComplete-v16xy-IEs ::=  SEQUENCE {
ue-Identity         ReestabUE-Identity,
 spare              BIT STRING (SIZE (3))
nonCriticalExtension     SEQUENCE {}            OPTIONAL
}
ReestabUE-Identity ::=    SEQUENCE {
   c-RNTI              RNTI-Value,
physCellIdPhysCellID,
shortMAC-I            ShortMAC-I
```

RRC reconfiguration complete message including the information about the old source code

FIG. 10C

```
RRCReconfigurationComplete ::=      SEQUENCE {
rrc-TransactionIdentifier        RRC-
TransactionIdentifier,
criticalExtensions              CHOICE {
rrcReconfigurationCompleteRRCReconfigurationComplete
-IEs,
criticalExtensionsFuture         SEQUENCE {}
    }
}

RRCReconfigurationComplete-IEs ::=      SEQUENCE {
lateNonCriticalExtension            OCTET STRING
OPTIONAL,
nonCriticalExtension    RRCReconfigurationComplete-v1530-
IEs  OPTIONAL
}

RRCReconfigurationComplete-v1530-IEs ::=     SEQUENCE {
uplinkTxDirectCurrentListUplinkTxDirectCurrentList
OPTIONAL,
nonCriticalExtension  RRCReconfigurationComplete-v1560-
IEs  OPTIONAL
}

RRCReconfigurationComplete-v1560-IEs ::=   SEQUENCE {
scg-Response                  CHOICE {
     nr-SCG-Response                OCTET STRING,
eutra-SCG-Response              OCTET STRING
}
OPTIONAL,
nonCriticalExtension
RRCReconfigurationComplete-v16xy-IEs
OPTIONAL
}

RRCReconfigurationComplete-v16xy-IEs ::=   SEQUENCE {
   c-RNTI             RNTI-Value,
physCellIdPhysCellId,
shortMAC-I            ShortMAC-I
   spare           BIT STRING (SIZE (3))
nonCriticalExtension         SEQUENCE {}
OPTIONAL
}
```

RRC reconfiguration message/Signaling to realize the fallback to the re-establishment procedure

FIG. 12B

CHO configuration of the TgNB in
an RRC reconfiguration message

Measurement object : X
Report Configuration : Y
Measurement Identified : N (link X, Y)
CHO target cell configuration Source cell configuration
RRC container CHO candidate Configuration
Candidate ID;
Measurement Identifier;
Tatget cell configuration
(prepared as delta over
the source cell configuration)

METHODS AND SYSTEMS FOR HANDLING CONDITIONAL HANDOVER (CHO) IN A WIRELESS COMMUNICATION NETWORK

CROSS-REFERENCE TO RELATED APPLICATION(S)

This application is based on and claims priority under 35 U.S.C. § 119(a) to Indian Provisional Patent Application No. 201941032619, filed on Aug. 12, 2019, and Indian Patent Application No. 201941032619, filed on Aug. 7, 2020, in the Indian Intellectual Property Office. The disclosures of the above-named applications are incorporated by reference herein in their entireties.

TECHNICAL FIELD

The present disclosure relates to the field of wireless communication networks and more particularly to controlling enhanced mobility in a wireless communication network by configuring a User Equipment (UE) with conditional handover (CHO) and optimizing performance of the CHO.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, various studies on a technology in a wireless communication system, such as conditional handover (CHO), are in progress to secure and enhance mobility in various communication environments.

OBJECTS

The principal object of the embodiments herein is to disclose methods and systems for controlling enhanced mobility in a wireless communication network by configuring at least one User Equipment with Conditional Handover (CHO) configurations of CHO candidate target Base Stations (BSs).

Another object of the embodiments herein is to disclose methods and systems for reconfiguring the at least one UE with updated CHO configurations, on an occurrence of at least one event after configuring the at least one UE with the CHO configurations, wherein the at least one event include at least one of a change in source cell configuration and a change in a target cell configuration.

Another object of the embodiments herein is to disclose methods and systems for reconfiguring the at least one UE by performing one of a one-step reconfiguration method and a two-step reconfiguration method.

Another object of the embodiments herein is to disclose methods and systems for enabling the CHO candidate target BS(s) to release the CHO configuration that is configured earlier on the at least one UE, when the CHO candidate target cell does not serve the at least one UE.

Another object of the embodiments herein is to disclose methods and systems for enabling the CHO candidate target BS(s) to serve the at least one UE by retrieving UE context and Sequence Number (SN) status transfer from an old source cell, when the at least one UE encounters at least one failure on the old source cell.

Another object of the embodiments herein is to disclose methods and systems for enabling the at least one UE to release the CHO configurations of the CHO candidate target cells, on transiting to a Radio Resource Control (RRC) inactive state from the RRC connection state.

SUMMARY

Accordingly, the embodiments herein provide methods and systems for handling Conditional Handover (CHO) in a wireless communication network. A method disclosed herein includes configuring, by a source Base Station (BS), a User Equipment (UE) with at least one CHO candidate target cell configuration and at least one CHO triggering condition of at least one CHO candidate target BS. The method further includes reconfiguring the UE with at least one updated CHO candidate target cell configuration of the at least one CHO candidate target BS, on detecting occurrence of at least one reconfiguration event. The method further includes performing, by the UE, a CHO execution to one of a CHO candidate target cell of the at least one CHO candidate target BS, based on the updated CHO candidate target cell configuration and the at least one CHO triggering condition of the at least one CHO candidate target BS.

Accordingly, embodiments herein provide a wireless communication network comprising a plurality of User Equipments (UEs), and a plurality of Base Stations (BSs). A source BS of the plurality of BSs is configured to configure a UE of the plurality of UEs with at least one CHO candidate target cell configuration and at least one CHO triggering condition of at least one CHO candidate target BS of the plurality of BSs. The source BS is further configured to reconfigure the UE with at least one updated CHO candidate target cell configuration of the at least one CHO candidate target BS, on detecting occurrence of at least one reconfiguration event. The UE is configured to perform a CHO execution to one of a CHO candidate target cell of the at least one CHO candidate target BS, based on the updated CHO candidate target cell configuration and the at least one CHO triggering condition of the at least one CHO candidate target BS.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which:

FIG. 10b depicts an example RRC reconfiguration complete message including information about an old source cell, according to embodiments as disclosed herein;

FIG. 10c depicts an example signaling provided to the UE for realizing the fall-back to the RRC establishment procedure, according to embodiments as disclosed herein;

FIG. 12b depicts the CHO configuration of the CHO candidate target cell, according to embodiments as disclosed herein.

DETAILED DESCRIPTION

Figure 1:
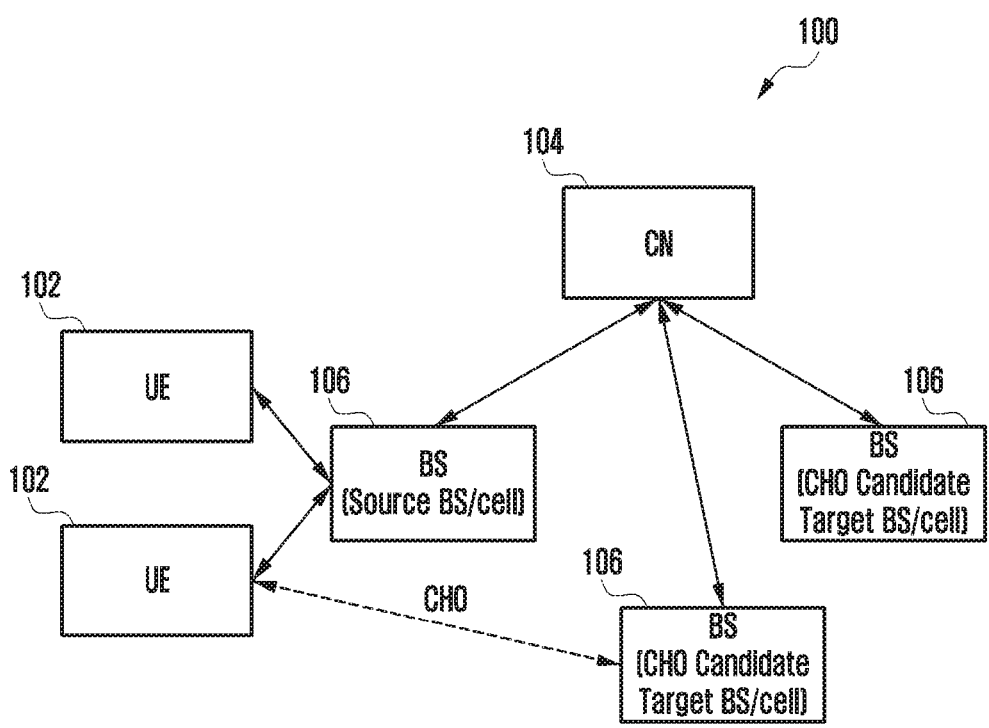
FIG. 1 depicts a wireless communication network, according to embodiments as disclosed herein.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

In general, a wireless communication network monitors the behavior of a User Equipment (UE) and provides necessary resources to the UE to perform one or more operations. Examples of the wireless communication network can be, but is not limited to, a Long-Term Evolution (LTE)/4G network, a New Radio (NR)/5G network, and so on. Examples of the one or more operations can be, but is not limited to, an uplink data transfer, a downlink data transfer, and so on. Signal strength and quality experienced by the UE while performing the one or more operations may vary based on proximity of the UE with a Base Station/Radio Access Network (RAN) node (gNodeB (gNB)/eNodeB (eNB)) (i.e., distance from the BS) and interference experienced by the UE from a neighboring BS. The UE which is near to the BS/cell, may have better signal strength compared to the UE which is far from the BS (i.e., a cell edge situation). Further, when a serving BS/cell and the neighboring BSs/cells have low load, then the UE experiences less interference.

In the wireless communication network, the BS/RAN node may always maintain a context of the UEs that are in an active Radio Resource Control (RRC) connection state. At any point of time, due to various reasons (such as but not limited to, weak signal conditions, heavy load on the serving BS, or the like), the serving BS/source cell can perform a handover of the UE from its control to another BS/cell (referred hereinafter to as a target BS/cell). Performing the handover involves transferring the entire context of the UE from the source cell to the target cell and changing a primary cell (PCell) for the UE. The serving cell performs the handover of the UE to the target cell on receiving assistance information from the UE. The assistance information includes measurement reports of the neighbor cells. The serving cell configures the UE to measure the signal strength of the serving cell and the neighbor cells on a same frequency or different frequencies that may belong to different BSs/cells. The serving cell further configures the UE with specific measurement and reporting criteria. On satisfying the configured measuring and reporting criteria, the UE sends the assistance information to the serving cell for the handover.

In a typical handover method, the serving cell triggers a handover procedure by sending a handover (HO) request to the target cell. On receiving an acknowledgement (ACK) from the target cell in response to the HO request, the serving cell initiates the handover of the UE by sending RRC reconfigurations to the UE. The RRC reconfigurations include the HO command with configurations of the target cell. On receiving the RRC reconfigurations from the serving cell, the UE initiates a random-access procedure by sending a Physical Random Access Channel (PRACH) preamble to the target cell for the handover. However, when the UE moves or rotates on initiating the handover, the UE can experience very fast degradation in the signal strength The UE can experience very fast degradation in the signal strength, as the UE is enabled to perform the one or more operations at a frequency range 2 (FR2) or higher frequency ranges. At the FR2 or the higher frequency ranges, a change in the signal strength and degradation in the signal strength can be more adverse than that at a frequency range 1 (FR1) or lower frequency ranges. Such a fast degradation in the signal strength may result in higher probability of handover failures. Also, due to the fast degradation in the signal strength, the UE may not be able to receive the HO command from the serving cell. Thus, resulting in the handover failures.

In order to reduce the handover failures due to the fast degradation in the signal strength, 3GPPP defines a Conditional handover (CHO).

In a conventional CHO method, the serving cell initiates a CHO preparation with one or more neighbor cells for the UE, on receiving the measurements of the one or more neighbor cells from the UE. The serving cell receives an acknowledgement from the one or more neighbor cells that have successfully prepared (i.e., admission control success) to serve the UE. The one or more neighbor cells that send the acknowledgement to the serving cell can be candidate target cells/CHO candidate target cells for the CHO. The acknowledgement received from the target/neighbor cell includes configurations/CHO configurations of the target cell that the UE has to apply, when performing the CHO to handover to the target cell. The serving cell sends an RRC reconfiguration message to the UE, which includes the CHO configurations of the one or more candidate target cells. The serving cell additionally provides one or more triggering conditions associated with the CHO configurations to the UE. The one or more triggering conditions can be used by the UE to evaluate if the handover can be triggered to any of the configured CHO candidate target cells. Unlike the typical handover method, the UE does not initiate the handover execution, on receiving the RRC reconfiguration message including the CHO configurations. The UE stores the received CHO configurations. The UE evaluates the one or more triggering conditions associated with the CHO configurations and initiates the handover execution automatically, once the one or more triggering conditions associated with the CHO configurations have satisfied. Thus, the CHO ensures that the RRC reconfiguration message (including the CHO configurations of the CHO candidate target cells) is provided to the UE in advance to poor radio signaling conditions. Providing the UE with the RRC reconfiguration message in advance reduces a probability of failures due to non-reception of the HO command from the serving BS/cell, which further improves mobility robustness.

In the conventional CHO method, the UE stores application server (AS) context, when the UE perform transitions from the RRC connection state to an RRC inactive state. The AS context includes the RRC reconfiguration message (including the CHO configurations of the CHO candidate target cells) and configurations of a special cell (SpCell). The UE applies the CHO configurations to initiate the HO execution with one of the CHO candidate target cells, once the UE resumes the RRC connection state from the RRC inactive state. However, when the UE resumes the RRC connection state, the CHO configurations may not be valid. Thus, resulting in an increased amount of signaling.

Further, when the UE resumes the RRC connection state from the RRC inactive state, configurations of the serving cell may change. The change in the configurations of the serving cell affects the configurations of the CHO candidate target cells as well. Thus, in such a scenario, the UE may have invalid CHO configurations.

Further, once the UE is configured with the CHO, it may possible that load conditions on the CHO candidate target cells changes and the CHO candidate target cells may no longer serve the UE. The conventional CHO method does not involve any signaling that allows the CHO candidate target cells to modify or cancel the already acknowledged and prepared HO for the UE.

Embodiments herein disclose methods and systems for controlling enhanced mobility in a wireless communication network by configuring a User Equipment (UE) with conditional handover (CHO) and optimizing performance of the CHO.

Referring now to the drawings, and more particularly to FIGS. 1 through 12b, where similar reference characters denote corresponding features consistently throughout the figures, there are shown example embodiments.

FIG. 1 depicts a wireless communication network 100, according to embodiments as disclosed herein. Examples of the wireless communication network 100 can be, but is not limited to, a Long Term Evolution (LTE)/4G network, an advanced LTE network, a New Radio (NR)/5G network, a Universal Mobile Telecommunications Service (UMTS), a Global System for Mobile Communications (GSM) Enhanced Data rates for GSM Evolution (EDGE) Radio Access Network (GERAN) system or any other next generation networks.

The wireless communication network 100 includes a plurality of User Equipments (UEs) 102, at least one Core Network (CN) 104, and a plurality of Base Stations/Radio Access Network (RAN) nodes 106.

The UE(s) 102 referred herein can be a user device that is capable of supporting the wireless communication network 100. Examples of the UE 102 can be, but is not limited to, a mobile phone, a smartphone, a tablet, a phablet, a personal digital assistant (PDA), a laptop, a computer, a wearable computing device, a vehicle infotainment device, an Internet of Things (IoT) device, a Virtual Reality (VR) device, a Wireless Fidelity (Wi-Fi) router, a USB dongle, a robot, an auto-guided vehicle, or any other device that supports the wireless communication network 100.

The UE 102 can be connected with at least one BS 106 over an interface supported by the wireless communication network 100 to perform one or more operations. Examples of the interface can be, but is not limited to, a wired interface, a wireless interface (for example: an air interface, an Nu interface, or the like), a wireless fronthaul interface, a wired or wireless backhaul interface, or any structure supporting communications over a wired or wireless connection. Examples of the operations can be, but not limited to, uplink data transfer, downlink data transfer, and so on. In an example herein, the data can be at least one of, but not limited to, voice packets, video packets, data packets, and so on.

The UE 102 can be operated in various states such as, but is not limited to, a Radio Resource Control (RRC) connection state, an RRC inactive/idle state, and so on. The RRC connection state can be a state in which the UE 102 has established an RRC connection with the at least one BS 106 for performing the one or more operations. The RRC inactive state can be a state in which the UE 106 has not established the RRC connection with any of the BSs 106.

The CN 104 referred herein can be one of, but is not limited to, an Evolved Packet Core (EPC), a 5G core (5GC) network, or the like. The CN 104 can be connected to the one or more BSs 106 and an external data network (not shown). Examples of the external data network can be, but not limited to, the Internet, a Packet Data Network (PDN), an Internet Protocol (IP) Multimedia Core Network Subsystem, and so on. The CN 104 can be configured to connect the at least one UE 102 (that is connected with the associated BS 106) to the external data network for performing the one or more operations.

The BS(s)/RAN node(s) 106 referred herein can be nodes such as, but not limited to, evolved nodes (eNBs), New Radio nodes (gNBs), and so on. The BS(s) 106 can be associated with one or more cells. In an embodiment, the terms such as the BS 106 and the cells 106 can be used interchangeably through the document. The BS 106 can connect the one or more UEs 106 with the CN 104. The BS 106 can be configured to perform radio resource management functions such as, but not limited to, radio bearer control, radio admission control, connection mobility control, dynamic allocation of resources to the UE in uplink/downlink (scheduling), and so on.

The BS(s) 106 referred herein can act as a serving BS/cell or a neighbor BS/cell for the UE 102. The BS 106, which is connected with the UE 102 is referred herein as a source BS/cell. Embodiments herein use the terms such as, but not limited to, "serving BS/cell", "source BS/cell", "primary cell (PCell)", "primary BS", and so on, interchangeably to a BS/cell that is currently connected with the UE 102. The BS/cell 106, which can be present in proximity to the UE 102 is referred herein as a neighbor BS/cell (i.e., not connected with the UE).

The source BS/cell 106 can be configured to maintain context of the UE 102 (hereinafter referred as UE context). The UE context can be necessary information required to maintain and provide communication services (for example: voice packets, video packets, data packets, or the like) towards the UE 102. The UE context may include information such as, but not limited to, UE state information (for example: the RRC connection state, the RRC inactive state, or the like), security information, UE capability information, identities of the UE-associated logical S1 connection, and so on.

The source BS/cell 106 can also be configured to monitor behavior/mobility of the UE 102 and to perform a handover of the UE 102 to a target BS/cell 106. The target BS/cell 106 can be one of the neighbor BSs/cells of the UE 102. The handover of the UE 102 involves transferring the UE context from the source BS/cell 106 to the target BS/cell 106.

In an embodiment, the source cell 106 can be configured to control enhanced mobility of the UE 102 by configuring the UE 102 with a conditional handover (CHO) and optimizing performance of the CHO.

The source cell 106 initiates a CHO candidate cell preparation, on receiving the measurements of the one or more neighbor cells from the UE 102. The source cell 106 may receive the measurements of the one or more neighbor cells from the UE 102, when the UE 102 experiences degradation in signal strength associated with the source cell and degradation in quality of the communication service being accessed by the UE 102. During the CHO candidate cell preparation, the source cell 106 sends its configuration that is the current configuration available on the UE (referred herein after as serving/source cell configurations) to the one or more cells. In an embodiment, the one or more cells can be cells of the source BS 106 or the neighbor BS 106. The source cell 106 may send the source cell configuration to the one or more cells 106 in a handover request as a handover preparation. On receiving the source cell configurations, the one or more cells on the BS(s) (which have received the handover request), may perform admission control and reserve resources for the UE 102. The one or more cells who perform the admission control and reserve resources for the UE 102 for the handover are referred hereinafter as CHO candidate target cells through the document. Each CHO candidate target cell 106 prepares target cell configuration (i.e. configurations the UE 102 can apply, if the UE 102 choses to execute the CHO handover to the corresponding candidate target cell), on reserving the resources for the UE 102. In an embodiment, each CHO candidate target cell 106 may prepare the target cell configurations as delta over the received source cell configurations. Preparing the target cell configuration as the delta over the source cell configuration implies that the target cell configuration has been prepared without releasing the source cell configuration (i.e., the target cell configuration has been prepared with respect to the received source cell configuration or the target cell configuration has been updated over the existing source configuration).

The one or more CHO candidate target cells 106 may further include the target cell configurations prepared as the delta over the source cell configurations in a container. The container referred herein can be an RRC message, which enables the source cell 106 to skip a decoding process that has to be performed on the container. Embodiments herein use the terms such as "container", "RRC container", "RRC reconfiguration message", and so on interchangeably to refer to an RRC message on which the decoding process can be skipped. Thus, the target cell configurations of the one or more CHO candidate target cells 106 may be represented as:

Target cell configurations=Source cell configuration+ Container(target cell configurations prepared as delta over the source cell configurations)

Embodiments herein use the terms such as "CHO target cell configurations", "CHO candidate target cell configurations", "target cell configurations", and so on, interchangeably to refer to configurations of the CHO candidate target cells 106.

In an embodiment, the one or more CHO candidate target cells 106 may prepare the CHO target cell configurations based on UE capability coordination and the source cell configurations. Thus, the source or target cell configurations may be reconfigured by ensuring that the reconfigured source or target cell configurations may fall within the UE capability coordination and may be complied by the UE 102. The one or more CHO candidate target cells 106 include the CHO target cell configurations in an RRC reconfiguration message. The one or more CHO candidate target cells 106 send the RRC reconfiguration message to the source cell 106 in a handover request acknowledgement message.

The source cell 106 encapsulates the container received from the one or more CHO candidate target cells 106 into the RRC reconfiguration message and identifies the CHO target cell configurations included in the RRC reconfiguration message. The source cell 106 prepares CHO configurations for the one or more CHO candidate target cells by associating a triggering condition/CHO triggering condition with the CHO target cell configuration of each CHO candidate target cell. Thus, the CHO configurations include the CHO target cell configuration of each CHO candidate target cell 106 and the CHO triggering condition associated with each CHO target cell configuration. The CHO triggering condition can be based on the measurement events such as, but not limited to, an event A3, an event A5, and so on.

The CHO triggering condition for each CHO candidate target cell 106 includes a measurement object and a reporting configuration. The measurement object can be, but not limited to, Reference Signal Receive Power (RSRP), Reference Signal Received Quality (RSRQ), and so on. The measurement object can indicate a frequency on which the CHO candidate target cells 106 can operate. The reporting configuration can state at least one condition that the associated CHO candidate target cell has to be satisfied, so that UE 102 can initiate CHO execution for the handover to one of the CHO candidate target cell 106. The source cell 106 design the report configuration for the CHO irrespective of whether the handover is configured for the same frequency. The source cell 106 may use the CHO in addition to a normal handover. The normal handover can be used for an improved network control and the CHO can be used for improving robustness of the handover. The source cell 106 may design the report configuration for the CHO based on one or more options. Examples of the options can be, but not limited to, usage of separate report configuration for the CHO (i.e., a blind configuration), usage of report configuration for the CHO, which have been used for the normal handover, usage of the report configuration for the CHO by adding a CHO offset in the report configurations used for the normal handover, and so on. Similarly, the source cell 106 may design the measurement object based on the one or more options. Examples of the options can be, but not limited to, reuse of the measurement object configured for other Radio Resource Management (RRM) purposes (same parameter values can be used), configuring the measurement object separately for the CHO (i.e., blind configuration), and so on.

The source cell 106 links the measurement object and the report configuration using a measurement identifier (like an ID, or an IE). The measurement identifier holds a unique integer value that cannot be applied for any other CHO candidate target cells 106. Therefore, using the measurement identifier, the UE 102 can uniquely identify the CHO candidate target cell to which the CHO triggering condition is associated. Alternatively, the source cell 106 may configure a new identifier or the measurement identifier within the CHO configurations for linking the measurement object and the report configuration. The new identifier can incur more overhead, but the new identifier can be used if the same CHO triggering condition is applied for multiple candidates. Further, usage of the new identifier automatically avoids the RRM (i.e., no triggering of the measurement report upon meeting the CHO triggering condition).

The source cell 106 may provide the measurement identifiers associated with the CHO triggering conditions to the one or more target cells 106 along with the source cell configuration in the handover request. The one or more CHO candidate target cells 106 may add the measurement identifiers in the container, which carries the CHO target cell configurations. Adding the measurement identifier in the container enables the UE 102 to have complete comprehension of the association between the CHO triggering condition and the CHO target cell configuration. Thus, the CHO configurations may include the container with the CHO target cell configurations and the measurement identifier corresponding to the CHO triggering condition. Alternatively, the source cell 106 can include the report configuration and the measurement object (configured for the CHO) within existing measurement configurations rather than within the CHO target cell configurations (i.e., not inside the RRC container). Alternatively, the source cell 106 may enable the target cell 106 to add the CHO triggering condition outside the RRC container. In such a scenario, if the UE 102 performs autonomous release of the CHO configurations, the UE 102 has to remove the CHO triggering conditions separately.

In an embodiment, the source cell 106 may associate the same CHO triggering condition with the CHO target cell configurations of the one or more CHO candidate target cells. In such a case, the source cell 106 uses a new unique identifier to uniquely identify the CHO candidate cell to which the CHO triggering condition is associated. The source cell 106 signals the new unique identifier to the one or more CHO candidate target cells 106. The one or more CHO candidate target cells 106 may add a value in the CHO target cell configurations, which indicate the new unique identifier. The one or more CHO candidate target cells 106 may also add the value indicating the new unique identifier as a part of the RRC reconfiguration message inside the container.

In an embodiment, the source cell 106 may associate multiple CHO triggering conditions with the CHO target cell configurations of the one or more CHO candidate target cells. The source cell 106 may associate the multiple CHO triggering conditions for each CHO candidate target cell 106 by combining two events such as, but not limited to, the event A3, the event A5, or the like. In order to avoid the measurement burden on the UE 102, the source cell 106 may use the events on different trigger quantity. For example, the event A3 can be a RSRP based event and the event A5 can be a RSRQ based event or vice-versa. The source cell 106 can combine the two events using a single logical 'AND' operation. The support of the two trigger conditions combined through the single logical 'AND' operation can be an enhancement only for the CHO operations. The CHO triggering conditions including the combination of the two events cannot be applied to a measurement reporting. The measurement ID or the new equivalent ID used for the linkage and the report configurations within the CHO configurations can have options to link the two report configurations, which include the two events.

The source cell 106 sends the CHO configurations of the one or more CHO candidate target cells 106 to the UE 102, wherein each CHO configuration corresponding to each CHO candidate target cell may include the CHO target cell configuration and the associated CHO triggering condition. On receiving the CHO configurations of the one or more CHO candidate target cells, the UE 102 stores the CHO configurations in a CHO candidate target list. As the received CHO target cell configurations include a combination of the source cell configuration and the container with the target cell configurations prepared as delta over the source cell configurations, the UE 102 can apply the source cell configuration prior to performing a CHO execution to continue in the source cell 106. The UE 102 may perform the CHO execution for the handover, when the CHO triggering condition associated with one of the CHO candidate target cells is satisfied. The CHO execution involves applying the target cell configurations prepared as delta over the source cell configurations to handover to the one of the CHO candidate target cells which satisfies the CHO triggering condition. Therefore, handover failures may be reduced by providing the CHO configurations to the UE 102 in advance to poor cell-edge radio conditions.

In an embodiment, the UE 102 may select one of the CHO candidate target cells for the handover based on its implementation, when the CHO triggering conditions associated with the two or more CHO candidate target cells have satisfied. In an embodiment, the UE 102 may select the CHO candidate target cell (from the two or more CHO candidate target cells) for the handover, which has highest CHO triggered conditions in terms of radio quality (i.e., Reference Signal Receive Power), when the CHO triggering conditions associated with the two or more CHO candidate target cells have satisfied. In an embodiment, the UE 102 may select the CHO candidate target cell from the two or more CHO candidate target cells based on random access RA resource configuration (for example: if contention free resource is configured, or the like), when the CHO triggering conditions associated with the two or more CHO candidate target cells have satisfied. In an embodiment, the UE 102 may select the CHO candidate target cell from the two or more CHO candidate target cells based on a combination of two events (a combined event) associated with each CHO candidate target cell, when the CHO triggering conditions associated with the two or more CHO candidate target cells have satisfied. In an example, the combined event may include a RSRP based event A3 and a RSRP based event A4. In such a scenario, the UE 102 may specify the combined event by applying a weight factor w for the event A3 and $(1-w)$ for the event A4, wherein a value of the weight factor w is less than 1 In another example, the combined events may include a RSRP based event A3 and a RSRQ based event A4 or vice-versa. In such a scenario, the UE 102 may specify the combined event by applying a weight factor w for the event A3 and $(1-w)$ for the event A4, wherein a value of the weight factor w is less than 1. Alternatively, the UE 102 may apply equal weightage to both the events. On selecting the CHO candidate cell 106 for the handover, the UE 102 applies the CHO target cell configuration of the selected CHO candidate target to handover to the selected CHO candidate cell 106.

Embodiments herein enable the UE 102 to release the stored CHO configurations, upon performing a transition to the RRC inactive state from the RRC connection state. The UE 102 may transit to the RRC inactive state, on receiving the CHO configurations of the one or more candidate target cells 106 from the source cell 106. The UE 102 may receive an RRC release message from the source cell 106 with suspended configurations, which enables the UE 102 to transit to the RRC inactive state from the RRC connection state. However, the suspended configurations do not explicitly indicate the UE 102 for releasing the CHO configurations. In such a scenario, the UE 102 releases the stored CHO configurations upon transiting to the RRC inactive state. Thus, the handover failures due to a change in the CHO configurations may be reduced.

Embodiments herein enable the source cell 106 to reconfigure the UE 102 with updated CHO configurations, on detecting occurrence of at least one event after providing the UE 102 with the CHO configurations of the one or more CHO candidate target cells 106. Examples of the at least one event can be, but not limited to, a change in the source cell configurations, a change in the target cell configurations, or the like.

In an embodiment, the source cell 106 may reconfigure the UE 102 with updated source cell configurations and target cell configurations independently, on detecting the occurrence of the at least one event after providing the UE 102 with the CHO configurations of the one or more CHO candidate target cells 106. Consider an example event, wherein the source cell configuration has been changed after providing the CHO configurations to the UE 102 and the changed source cell configuration does not impact the target cell configurations. In such an event, the source cell 106 may provide only the changed/updated source cell configuration to the UE 102 in the RRC reconfiguration message. The source cell configuration may be reconfigured as a delta over the existing source cell configuration. The reconfigured/updated source cell configuration is referred hereinafter as a delta source cell configuration through the document. Therefore, the UE 102 may receive the updated source cell configuration without any change to the already stored CHO target cell configurations. Consider another example event, wherein the CHO target cell configuration(s) of the CHO candidate target cell(s) 106 has been changed/reconfigured after providing the CHO configurations to the UE 102 and the changed target cell configuration does not impact the source cell configuration. In such an event, the source cell 106 receives the reconfigured/updated target cell configuration from the CHO candidate target cell 106. The target cell configuration may be reconfigured as a delta over the source cell configuration available to the CHO candidate target cell 106. The reconfigured/updated CHO target cell configuration is referred hereinafter as a delta CHO target cell configuration through the document. The source cell 106 provides the delta CHO target cell configuration to the UE 102. The UE 102 forms the CHO configuration for the CHO candidate target cell for the handover as a combination of the source cell configuration that have currently available at the UE 102 and the received delta CHO target cell configuration.

In an embodiment, the source cell 106 does not provide the updated source cell configuration and the updated CHO target cell configuration(s) independently to the UE 102 in one or more scenarios, wherein the source cell configuration impacts the CHO target cell configurations or vice versa. Consider an example scenario, wherein the source cell configuration has been changed after providing the CHO configurations to the UE 102 and the changed source cell configuration may impact the CHO target cell configurations. In such a scenario, if the source cell 106 sends the RRC reconfiguration message including only the source cell configurations to the UE 102 may lead to potential CHO target cell configurations, which can be generated as the combination of the changed/updated source cell configurations and the already available CHO target cell configurations. Consider another example scenario, wherein the CHO target cell configuration(s) of the CHO candidate target cell 106 has been changed after providing the CHO configurations to the UE 102 and the target cell configuration may impact the source cell configurations. In such a scenario, updating the UE 102 with the changed/updated CHO target cell configuration (before updating the source cell configuration) may result in invalid CHO target cell configuration, which have been generated as the combination of the source cell configuration available at the UE 102 and the updated delta target cell configurations (sent by the CHO candidate target cell(s) to the UE 102). Thus, in above example scenarios, the source cell 106 does not update the UE 102 with the source cell configuration and the target cell configurations(s) independently.

In an embodiment, the source cell 106 may reconfigure the UE 102 by performing a one step reconfiguration, on detecting the at least one event after providing the CHO configurations to the UE 102. The one step reconfiguration of the UE 102 includes sending both the updated/delta source and CHO target cell configurations to the UE 102 at a time in a single RRC reconfiguration message. When the source cell configuration has been changed after providing the CHO configurations to the UE 102, the source cell 106 sends the delta source cell configuration (i.e. the change in the source cell configuration with respect to the earlier/previous source cell configuration based on which the CHO configuration was generated by each candidate target cells) to the CHO candidate target cells in the handover request. On receiving the delta source cell configuration, the CHO candidate target cells 106 prepare updated/delta CHO target cell configurations in the container. Preparing the updated CHO configurations involve updating the CHO target cell configurations as delta over the delta source cell configurations. Thus, the updated/delta CHO target configurations include the delta source cell configuration and the container including the target cell configurations prepared as delta over the delta source cell configuration. The CHO candidate target cells 106 send the delta CHO target cell configurations to the source cell 106 in the handover request acknowledgement message. On receiving the handover request acknowledgement message, the source cell 106 sends the RRC reconfiguration message to the UE 102. The RRC reconfiguration message includes the delta CHO target cell configurations of the CHO candidate target cells 106. The delta CHO target cell configuration of each CHO candidate target cell 106 includes the delta source cell configuration and the container including the corresponding target cell configuration prepared as delta over the delta source cell configuration.

In an embodiment, if the source cell 106 initiates the configuration change that impacts the target cell configurations, the source cell 106 sends a handover modify request to the one or more CHO candidate target cells 106. The source cell 106 waits for a reception of an acknowledgement and the delta CHO target cell configurations from the one or more candidate target cells 106. The source cell 106 forms the RRC reconfiguration message including the delta source cell configuration and the delta CHO target cell configurations. The source cell 106 sends the RRC reconfiguration message to the UE 102.

On receiving the RRC reconfiguration message, the UE 102 first updates the source cell configuration in the stored CHO configurations with the received delta source cell configurations. The UE 102 then updates the CHO target cell configurations in the stored CHO configurations with the received delta CHO target cell configurations. Thus, updating the stored CHO configurations.

The one step reconfiguration of the UE 102 may be suitable for the scenarios, wherein the updated source or target cell configurations can be transmitted to the UE 102 with delay. For example, transmission of the updated/delta source cell configuration to the UE 102 can be delayed, till the reception of the updated/delta CHO target cell configurations by the source cell 106 from the CHO candidate target cells 106. For another example, transmission of the updated/delta CHO target cell configurations to the UE 102 can be delayed, till the generation of the updated/delta source cell configuration by the source cell 106. However, in scenarios, wherein the transmission of the updated cell configurations to the UE 102 cannot be delayed, the updated source cell configurations have to be transmitted to the UE 102 immediately to ensure good Quality of Service (QoS) and uninterrupted service (i.e. a change in the source cell configurations have to be updated at the UE 102 immediately without waiting for the acknowledgment from the CHO candidate target cells 106). In such scenarios, if only the updated source cell configurations are provided to the UE 102, the CHO target cell configurations may become invalid, as the CHO target cell configurations stored at the UE 102 may be the combination of the updated source cell configuration and the existing CHO target cell configurations. Thus, in such scenarios, embodiments herein enable the source cell 106 to reconfigure the UE 102 by performing a two-step reconfiguration.

In the two-step reconfiguration of the UE 102, the source cell 106 sends a first RRC reconfiguration message to the UE 102, when the source cell 106 reconfigures its configuration. The first RRC reconfiguration message includes the updated/delta source cell configuration and the release of the CHO configurations corresponding to all the CHO candidate target cells 106. On receiving the first RRC reconfiguration message from the source cell 106, the UE 102 releases the stored CHO configurations and stores the updated/delta source cell configuration received from the source cell 106. On sending the first RRC message to the UE 102, the source cell 106 sends the handover modify request to the CHO candidate target cells 106. In response to the handover modify request, the source cell 106 receives the updated/delta CHO target cell configurations from the CHO candidate target cells 106 in a handover request acknowledgment. Once the updated/delta CHO target cell configurations are received, the source cell 106 sends a second RRC reconfiguration message to the UE 102, wherein the second RRC reconfiguration message includes the container with the delta target cell configurations. Also, the source cell 106 may include the source cell configurations that do not impact the CHO target cell configurations in the second RRC reconfiguration message. On receiving the second RRC reconfiguration message, the UE 102 stores the CHO target cell configurations of the CHO candidate target cells 106 by including the delta CHO target cell configurations with respect to the received delta source cell configurations in the first RRC reconfiguration message.

Embodiments herein enable the CHO candidate target cell to send a handover cancel request to the source cell 106, if the CHO candidate target cell 106 can no longer serve the UE 102 for which the CHO preparation is completed. The CHO candidate target cell(s) 106 performs the admission control and reserves resources for the UE 102, based on the handover request received from the source cell 106. On reserving the resources for the UE 102, the CHO candidate target cell 106 sends the handover request acknowledgement to the source cell 106 in response to the handover request. However, on sending the handover request acknowledgment to the source cell 106, the CHO candidate target cell 106 may reallocate the resources to the UE 102 in on one or more scenarios. Examples of the scenarios can be, but not limited to, change in load of the CHO candidate target cell 106, reallocation of the resources of the UE 102 configured with the CHO configurations for the other UEs 102, and so on. For example, the UE 102 may perform the CHO execution to handover to only one CHO candidate target cell 106 upon satisfying the associated CHO triggering condition. As there is uncertainty of when the actual CHO execution may be initiated by the UE 102, the CHO candidate target cell 106 may reallocate the reserved resources of the UE 102 configured with the CHO configurations to the other UEs, which are being attempting to access the CHO candidate target cell. Thus, the CHO candidate target cell 106 does not want to serve the UE 102 configured with its CHO configurations. For another example, on sending the handover request acknowledgement to the source cell 106, there may be increase in load on the CHO candidate target cell 106. In such a scenario, the CHO candidate target cell 106 does not want to serve the UE 102 configured with its CHO configurations.

When the CHO candidate target cell(s) 106 does not want to serve the UE 102 configured with its CHO configuration, the CHO candidate target cell 106 initiates a release of the CHO configuration provided for the UE 102. The CHO candidate target cell 106 initiates the release of the CHO configuration by sending a handover release/cancel request or CHO configuration release request to the source cell 106. The source cell 106 accepts the handover cancel request and sends a handover cancel request acknowledgment to the CHO candidate target cell 106, on receiving the handover cancel request. Further, on accepting the handover cancel request, the source cell 106 requests the UE 102 to release the CHO configuration of the CHO candidate target cell 106.

In an embodiment, the source cell 106 may accept the handover cancel request and send the handover cancel request acknowledgment to the CHO candidate target cell 106 by ensuring that the UE 102 has released the CHO configuration of the CHO candidate target cell 106. On receiving the handover cancel request or the CHO configuration release request from the CHO candidate target cell(s) 106, the source cell 106 sends the RRC reconfiguration message to the UE 102 for releasing the CHO configuration of the corresponding CHO candidate target cell 106. In an embodiment, on receiving the RRC reconfiguration message for releasing the CHO configuration of the candidate target cell 106, the UE 102 releases the CHO configuration of the candidate target cell 106 and sends an RRC reconfiguration complete message to the source cell 106. Releasing the CHO configuration on the UE 102 involves removing the stored CHO target cell configuration of the CHO candidate target cell 106 and the associated CHO triggering condition from the CHO candidate target cell list. In an embodiment, on receiving the RRC reconfiguration message for releasing the CHO configuration of the candidate target cell 106, the UE 102 releases the CHO configurations of the candidate target cell 106 and sends a Radio Link Control (RLC) acknowledgment to the source cell 106 as the RRC reconfiguration complete message. On receiving the RRC reconfiguration complete message from the UE 102, the source cell 106 accepts the handover cancel of the CHO candidate target cell and sends the handover cancel request acknowledgment to the CHO candidate target cell 106.

Embodiments herein enable the source cell 106 to reject the handover cancel received from the CHO candidate target cell 106, when the UE 102 is unable to receive the RRC reconfiguration message from the source cell 106 to release the CHO configuration of the CHO candidate target cell 106. The UE 102 configured with the CHO configurations of the CHO candidate target cells 106 continuously evaluates the associated CHO triggering conditions to initiate the CHO execution for the handover. Once the CHO triggering condition associated with one of the CHO candidate target cells is satisfied, the UE 102 initiates the CHO execution to handover to the corresponding CHO candidate target cell 106. During the CHO execution, sometimes the UE 102 may not able to connect to the source cell 106 to receive any information from the source cell 106 due to its hardware capability. In such a scenario, the UE 102 has instead tuned its radio frequency (RF) to frequency of the CHO candidate target cell 106 (for which the CHO triggering conditions are satisfied) for cell synchronization and subsequent handover execution procedures like initiating random access on the CHO candidate target cell 106. However, the CHO candidate target cell 106 may sent the handover cancel request to the source cell 106, when the CHO candidate target cell 106 does not want to serve the UE 102 configured with its CHO configurations. Thus, resulting in a scenario, where the UE 102 is being attempting to initiate the CHO execution to handover to the CHO candidate cell that has already sent a request to the source cell 106 for the handover cancel/release of the CHO configuration, so that handover of the UE 102 may fail.

In an embodiment, in order to avoid the handover failure, the source cell 106 rejects the handover cancel request received from the CHO candidate target cell 106, when the UE 102 is unable to receive the RRC reconfigurations from the source cell 106 for releasing the CHO configuration of the CHO candidate target cell 106. On receiving the handover cancel request or the CHO configuration release request from the CHO candidate target cell 106, the source cell 106 sends the RRC reconfiguration message to the UE 102 for releasing the CHO configuration of the CHO candidate target cell 106. If the UE 102 is unable to receive the RRC configuration message from the source cell 106, the source cell 106 rejects the handover cancel request received from the CHO candidate target cell 106 and sends a handover cancel reject message to the CHO candidate target cell 106. On receiving the handover cancel reject message from the source cell 106, the CHO candidate target cell 106 retains the CHO configuration provided to the UE 102. Thus, the handover failures may be avoided.

Embodiments herein enable the source cell 106 to send the RRC reconfiguration message in various procedures/methods to indicate the UE 102 to release the CHO configuration(s) of the CHO candidate target cell(s).

In an example procedure, the source cell 102 sends the RRC reconfiguration message including a CHO release message to the UE 102 for releasing the CHO configuration of the CHO candidate target cell 106. The CHO release message indicates the CHO configuration of the CHO candidate target cell, which has to be released. In such a scenario, the UE 102 sends the RRC reconfiguration complete message to the source cell 106, on releasing the CHO configuration of the indicated candidate target cell 106

In another example procedure, the source cell 106 sends the RRC reconfiguration message including only the source cell configuration to the UE 102 for releasing the CHO configuration(s) of the CHO candidate target cell(s) 106. In such a scenario, the UE 102 sends the RRC reconfiguration complete message to the source cell 106, on releasing the CHO configuration of the candidate target cell 106.

In another example procedure, the source cell 106 sends the RRC reconfiguration message including only the CHO target cell configuration to the UE 102 for releasing the CHO configuration of the CHO candidate target cell 106. In such a scenario, the UE 102 does not send the RRC reconfiguration complete message to the source cell 106. The UE 102 may send the RRC reconfiguration complete message to the CHO candidate target cell 106, on successful completion of the CHO execution.

In another example procedure, the source cell 106 sends the RRC reconfiguration message including the updated/delta source cell configuration and the CHO target cell configuration of the CHO candidate target cell 106 to the UE 102 for releasing the CHO configuration of the CHO candidate target cell 106. In such a scenario, the UE 102 sends the RRC reconfiguration complete message to the source cell 106 indicating that the UE 102 has complied with the received updated/delta source cell configuration. The UE 102 does not send the RRC reconfiguration complete message to the source cell 106 for acknowledging the updating of the CHO target cell configuration. However, the UE 102 sends the reconfiguration complete message to the CHO candidate target cell 106, on successful completion of the CHO execution to the CHO candidate target cell 106.

In another example procedure, the source cell 106 sends the RRC reconfiguration message including the updated/delta CHO target cell configuration to the UE 102 for releasing the CHO configuration. In such a scenario, the UE 102 sends the RRC reconfiguration complete message to the source cell 106 indicating that the UE 102 has released the CHO configurations of the indicated CHO candidate target cell.

In another example procedure, the source cell 106 sends the RRC reconfiguration message including the updated/delta source cell configuration and the CHO release message to the UE 102 for releasing the CHO configuration of the CHO candidate target cell 106. In such a scenario, the UE 102 sends a joint/combined RRC reconfiguration complete message to the source cell 106. The joint RRC reconfiguration complete message includes a reconfiguration complete message for the updated/delta source cell configurations and an embedded reconfiguration complete message indicating the release of the CHO configuration of the CHO candidate target cell 106. Alternatively, the RRC reconfiguration complete message includes the reconfiguration complete message for the updated/delta source cell configurations and a new indicator (IE) indicating that the release of the CHO configuration of the indicated CHO candidate target cell 106.

Embodiments herein enable the target cell 106 to send the RRC release message for an RRC re-establishment, when the UE 102 encounters at least one failure on the source cell 106. When the UE 102 configured with the CHO configurations of the CHO candidate target cells 106 encounters the at least one failure, the UE 102 initiates a recovery procedure by performing a cell selection process. Examples of the failure can be, but is not limited to, a Radio Link Failure (RLF), a handover failure while accessing the CHO candidate target cell, an integrity verification failure, a reconfiguration failure of the RRC message, and so on. The cell selection process involves selecting at least one BS/cell present in proximity to the UE 102 to camp on. On selecting the cell(s) by performing the cell selection, the UE 102 determines if the selected cell is the CHO candidate target cell using the CHO configurations stored in the CHO candidate target cell list. If the selected cell is not the CHO candidate target cell, then the UE initiates an RRC re-establishment procedure.

If the selected cell is the CHO candidate target cell configured to the UE 102 prior to encountering the at least one failure on the source cell 106, the UE 102 performs the CHO execution and sends the RRC reconfiguration complete message to the selected cell/CHO candidate target cell 106. The sent RRC reconfiguration complete message to the selected cell/CHO candidate cell can be an unexpected message for the selected cell, since the selected cell/CHO candidate target cell 106 has already been released the UE context and the resources reserved for the UE 102. The CHO candidate target cell 106 may release the UE context and the resources reserved for the UE 102, on receiving an indication from the source cell 106 after identifying the at least one failure encountered by the UE 102. Thus, when the UE 102 encounters the at least one failure, the CHO candidate target cell 106 may be expecting for only an RRC re-establishment request message from the UE 102. In such a scenario, the CHO candidate target cell 106 may send an RRC release message to the UE 102 in response to the unexpected RRC reconfiguration message. On receiving the RRC release message, the UE 102 may initiate the RRC connection setup procedure.

Embodiments herein enable the target cell 106 to perform a fall-back to connection setup procedure, when the UE 102 configured with the CHO configurations encounters the at least one failure on the source cell 102. The target cell 106 can be the cell, which has selected by the UE 102 on encountering the at least one failure and the selected cell is the CHO candidate target cell. In the fall-back to connection setup procedure, on receiving the unexpected RRC reconfiguration complete message, the CHO candidate target cell 106 may initiate a connection setup procedure with the UE 102. The connection setup procedure involves sending an RRC setup message to the UE 102 in response to the unexpected RRC reconfiguration complete message. The RRC setup message includes the configurations of the CHO candidate target cell 106. Initiating the connection setup procedure by the CHO candidate target cell 106 reduces over air signaling and enables data bearers (Signaling Radio Bearers (SRBs) and Dedicated Radio Bearers (DRBs)) to resume data transfer that has been ongoing prior to the at least one failure encountered by the UE 102. On receiving the RRC setup message from the CHO candidate target cell 106, the UE 102 releases all the existing CHO configurations of the CHO candidate target cells and applies the configurations of the target cell 106 received in the RRC setup message for connecting with the CHO candidate target cell 106.

Embodiments herein enable the target cell 106 to serve the UE 102 by retrieving the UE context from the source cell 106, when the UE 102 configured with the CHO configurations encounters the at least one failure on the source cell 106. The target cell 106 can be the cell, which has selected by the UE 102 on encountering the at least one failure and the selected cell is the CHO candidate target cell.

On encountering the at least one failure on the source cell, the UE 102 includes information about the source cell 106 in the unexpected RRC reconfiguration complete message. The source cell 106 can an old source cell that has served the UE 102 prior to encountering the at least one failure. The UE 102 sends the unexpected RRC reconfiguration complete message with the information of the old source cell 106 to the CHO candidate target cell 106. The information about the source cell 106 includes an indicator indicating the identity of the old source cell 106 and an authentication token of the old source cell 106 (which is required to validate the UE 102).

On receiving the unexpected RRC reconfiguration complete message with the information of the old source cell 106 from the UE 102, the CHO candidate target cell 106 may determine the old source cell 106 of the UE 102. The CHO candidate target cell 106 sends a RETREIVE UE CONTEXT message to the old source cell 106 and requests the old source cell 106 for the UE context. The UE context may provide information about the bearers that have been established at the UE 102 prior to encountering the at least one failure, so that the corresponding bearers can be re-established on the CHO candidate target cell 106. The old source cell 106 provides the UE context to the CHO candidate target cell 106.

On receiving the UE context from the old source cell 106, the CHO candidate target cell 106 sends the RRC reconfiguration message to the UE 102 based on the received UE context. The RRC reconfiguration message may include new configurations of the CHO candidate target cell 106. On receiving the RRC reconfiguration message from the CHO candidate target cell 106, the UE 102 applies the new configurations and sends the RRC reconfiguration complete message to the CHO candidate target cell 106.

Embodiments herein enable the target cell 106 to serve the UE 102 by retrieving the UE context and sequence number (SN) status transfer from the source cell 106, when the UE 102 configured with the CHO configurations encounters the at least one failure on the source cell 106. The target cell 106 can be the cell, which has selected by the UE 102 on encountering the at least one failure and the selected cell is the CHO candidate target cell.

On receiving the unexpected RRC reconfiguration complete message including the information about the old source cell 106 from the UE 102, the CHO candidate target cell 106 requests the old source cell 106 and retrieves the UE context. On receiving the UE context from the old source cell 106, the CHO candidate target cell 106 sends the RRC reconfiguration message to the UE 102 based on the received UE context. The RRC reconfiguration message may include the configurations of the CHO candidate target cell 106. On receiving the RRC reconfiguration message from the CHO candidate target cell 106, the UE 102 applies the received configurations and sends the RRC reconfiguration complete message to the CHO candidate target cell 106.

On receiving the RRC reconfiguration complete message from the UE 102, the CHO candidate target cell 106 requests the old source cell 106 for the SN status transfer. The SN status transfer includes Packet Data Convergence Protocol (PDCP) sequence numbers. The PDCP sequence numbers can be first missing data unit, if the at least one failure is encountered on the UE 102 during the uplink data transfer. The PDCP sequence numbers can be a next sequence number that has to be allocated for the UE 102, if the at least one failure is encountered on the UE 102 during the downlink data transfer. In an embodiment, for the SN status transfer message, the CHO candidate target cell 106 sends an XN-U address indication. The XN-U address indication includes forwarding address to the source cell 106, thereby informing the source cell 106 about the address of the CHO candidate target cell to which the status transfer and data forwarding has to be performed. The CHO candidate target cell 106 receives the SN status transfer from the source cell 106 in response to the sent XN-U address indication. The CHO candidate target cell 106 may use the SN status transfer message to ensure the failure recovery to be loss less.

In an embodiment, if the SN status transfer is already available on the CHO candidate target cell 106 prior to receiving the RRC reconfiguration complete message from the UE 102, the CHO candidate target cell 106 resumes the data transfer to the UE 102. The data transfer can be resumed in an increasing order of the SN indicated in the SN status transfer that has been received from the old source cell 106 (on which the UE 106 encounters the at least one failure).

In an embodiment, if the selected cell by the UE 102 by performing the cell selection (after encountering the at least one failure) is not the CHO candidate target cell, the UE 102 sends the re-establishment request including the information about the old source cell 106 to the selected cell/new target cell 106. In such a scenario, the new target cell 106 requests the old source cell and retrieves the UE context from the old source cell 106. The new target cell 106 may further requests the old source cell 106 for the SN status transfer, on successful re-establishment of connection between the UE 102 and the new target cell 106. On receiving the SN status transfer from the old source cell 106, the new target cell 106 resumes the data transfer to the UE 102 in the increasing order of the SN indicated in the received SN status transfer.

FIG. 1 shows exemplary units of the wireless communication network 100, but it is to be understood that other embodiments are not limited thereon. In other embodiments, the wireless communication network 100 may include less or more number of units. Further, the labels or names of the units are used only for illustrative purpose and does not limit the scope of the embodiments herein. One or more units can be combined together to perform same or substantially similar function in the wireless communication network 100.

Figure 2:
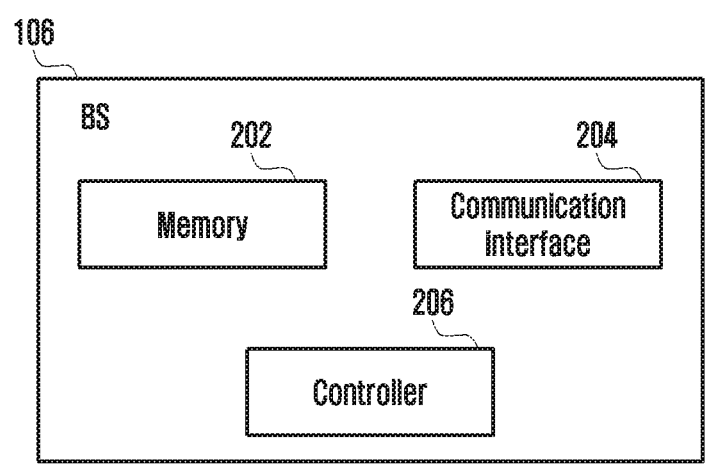
FIG. 2 is a block diagram depicting hardware components of a Base Station (BS)/cell, according to embodiments as disclosed herein.

FIG. 2 is a block diagram depicting hardware components of the BS 106, according to embodiments as disclosed herein. The BS 106 (the source BS/cell and the target BS/cell) includes a memory 202, a communication interface 204, and a controller 206. The BS 106 also includes at least one antenna, at least one RF transceiver, a processing circuitry, and so on (not shown).

The memory 202 can store at least one of the UE context, the source cell configuration, the CHO target cell configuration, the delta source cell configuration, the delta source cell configuration, the CHO configurations configured on the UE 102, the SN status transfer, and so on. Examples of the memory 202 can be, but not limited to, NAND, embedded Multimedia Card (eMMC), Secure Digital (SD) cards, Universal Serial Bus (USB), Serial Advanced Technology Attachment (SATA), solid-state drive (SSD), and so on. The memory 202 may also include one or more computer-readable storage media. The memory 202 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 202 may, in some examples, be considered a non-transitory storage medium. The term "non-transitory" may indicate that the storage medium is not embodied in a carrier wave or a propagated signal. However, the term "non-transitory" should not be interpreted to mean that the memory 202 is non-movable. In certain examples, a non-transitory storage medium may store data that can, over time, change (e.g., in Random Access Memory (RAM) or cache).

The communication interface 204 can be configured to enable the BS 106 to communicate with the at least one external entity (for example: the UE 102, the other BS 106, the CN 104, or the like) over the interface supported by the wireless communication network 100. Examples of the interface can be at least one of a wired or wireless fronthaul interface, a wired or wireless backhaul interface, or any structure supporting communications over a wired or wireless connection.

The controller 206 can be at least one of a single processer, a plurality of processors, multiple homogeneous or heterogeneous cores, multiple Central Processing Units (CPUs) of different kinds, microcontrollers, special media, and other accelerators. The controller 206 may be a general-purpose processor, such as a central processing unit (CPU), an application processor (AP), Digital Signal Processor (DSP), and so on.

When the BS 106 is the source cell 106, the controller 206 is configured to prepare the source cell configuration or the updated/delta source configuration. When the BS 106 is the source cell 106, the controller 206 is further configured to enable the source cell 106 to:

send the handover request to the CHO candidate target cells 106 for the CHO target cell configurations, wherein the CHO candidate target cells 106 can be cells of the source BS 106 or the at least one neighbor BS 106.

associate the CHO triggering condition with the CHO target cell configuration of each CHO candidate target cell 106;

configure the UE 102 with the CHO configurations of the CHO candidate target cells 106, wherein the CHO configuration of each CHO candidate cell includes the CHO target cell configuration and the associated CHO triggering condition;

reconfigure the UE 102 with the updated source cell configuration and the CHO target cell configurations independently;

perform the one step reconfiguration of the UE 102;

perform the two-step reconfiguration of the UE 102; and request the UE 102 to release the CHO configuration(s) of the CHO candidate target cell(s), when the CHO candidate target cell can no longer serve the UE 102.

When the BS 106 is the target cell 106, the controller 206 is configured to prepare the target cell configuration as delta over the source cell configuration or the updated/delta target cell configuration. When the BS 106 is the target cell 106, the controller 206 is further configured to enable the target cell 106 to:

send the CHO target cell configuration to the source cell 106;

initiate release of the CHO configuration for the UE 102, when the target cell 106 can no longer serve the UE 102;

perform the fall-back connection procedure, on receiving the unexpected RRC reconfiguration message from the UE 102 after encountering the at least one failure on the source cell 106;

retrieve the UE context from the old source cell 106 for serving the UE 102, on receiving the unexpected RRC reconfiguration message including the information about the old source cell 106 from the UE 102; and send the XN-U address indication to the old source cell 106 and retrieve the SN status transfer from the old source cell 106 for serving the UE 102, on receiving the unexpected RRC reconfiguration message including the information about the old source cell 106 from the UE 102.

FIG. 2 shows exemplary units of the BS 106, but it is to be understood that other embodiments are not limited thereon. In other embodiments, the BS 106 may include less or more number of units. Further, the labels or names of the units are used only for illustrative purpose and does not limit the scope of the embodiments herein. One or more units can be combined together to perform same or substantially similar function in the BS 106.

Figure 3:
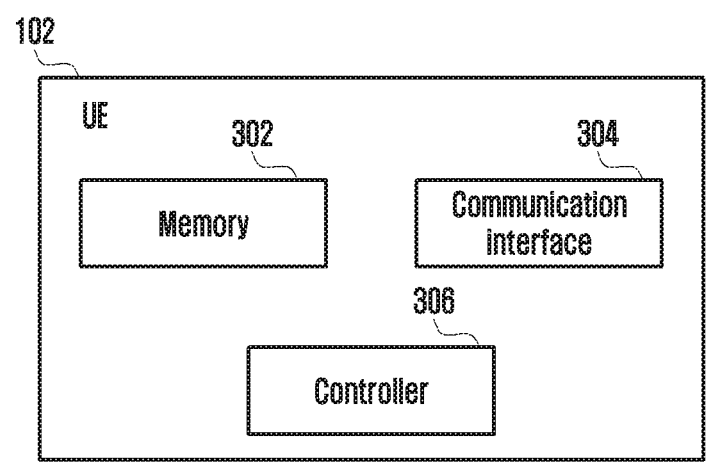
FIG. 3 is a block diagram depicting hardware components of a User Equipment (UE), according to embodiments as disclosed herein.

FIG. 3 is a block diagram depicting hardware components of the UE 102, according to embodiments as disclosed herein. The UE 102 includes a memory 302, a communication interface 304, and a controller 306. The UE 102 also includes at least one antenna, at least one RF transceiver, a processing circuitry, a display, Input/Output (I/O) ports, and so on (not shown).

The memory 302 can store at least one of, but not limited to, the CHO candidate target cell list, the CHO configurations of the CHO candidate target cells 106, the updated source/CHO target cell configurations, the information about the source cell 106, and so on. Examples of the memory 302 can be, but not limited to, NAND, embedded Multimedia Card (eMMC), Secure Digital (SD) cards, Universal Serial Bus (USB), Serial Advanced Technology Attachment (SATA), solid-state drive (SSD), and so on. The memory 302 may also include one or more computer-readable storage media. The memory 302 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 302 may, in some examples, be considered a non-transitory storage medium. The term "non-transitory" may indicate that the storage medium is not embodied in a carrier wave or a propagated signal. However, the term "non-transitory" should not be interpreted to mean that the memory 302 is non-movable. In certain examples, a non-transitory storage medium may store data that can, over time, change (e.g., in Random Access Memory (RAM) or cache).

The communication interface 304 can be configured to enable the UE 102 to communicate with the at least one external entity (the BS 106, the other UE 102, or the like) over the interface supported by the wireless communication network 100. Examples of the interface can be at least one of a wired or wireless fronthaul interface, a wired or wireless backhaul interface, or any structure supporting communications over a wired or wireless connection.

The controller 306 can be at least one of a single processer, a plurality of processors, multiple homogeneous or heterogeneous cores, multiple Central Processing Units (CPUs) of different kinds, microcontrollers, special media, and other accelerators. The controller 306 may be a general-purpose processor, such as a central processing unit (CPU), an application processor (AP), Digital Signal Processor (DSP), and so on.

The controller 306 can be configured to enable the UE 102 to:

store the CHO configurations of the CHO candidate target cells in the CHO candidate target cell list in the memory 302;

enable the CHO execution for the handover, when the CHO triggering condition associated with one of the CHO candidate target cells is satisfied;

select the CHO candidate target cell 106 for the handover, when the CHO triggering conditions associated with the two or more CHO candidate target cells are satisfied;

update the CHO configurations, on receiving the updated source and CHO target cell configurations from the source cell 106;

release the stored CHO configurations of the CHO candidate target cells 106, on receiving the RRC reconfiguration message from the source cell 106 for releasing the CHO configurations; and release the stored CHO configurations of the CHO candidate target cells 106, upon performing the transition to the RRC inactive state from the RRC connection state.

FIG. 3 shows exemplary units of the UE 102, but it is to be understood that other embodiments are not limited thereon. In other embodiments, the UE 102 may include less or more number of units. Further, the labels or names of the units are used only for illustrative purpose and does not limit the scope of the embodiments herein. One or more units can be combined together to perform same or substantially similar function in the UE 102.

Figure 4:
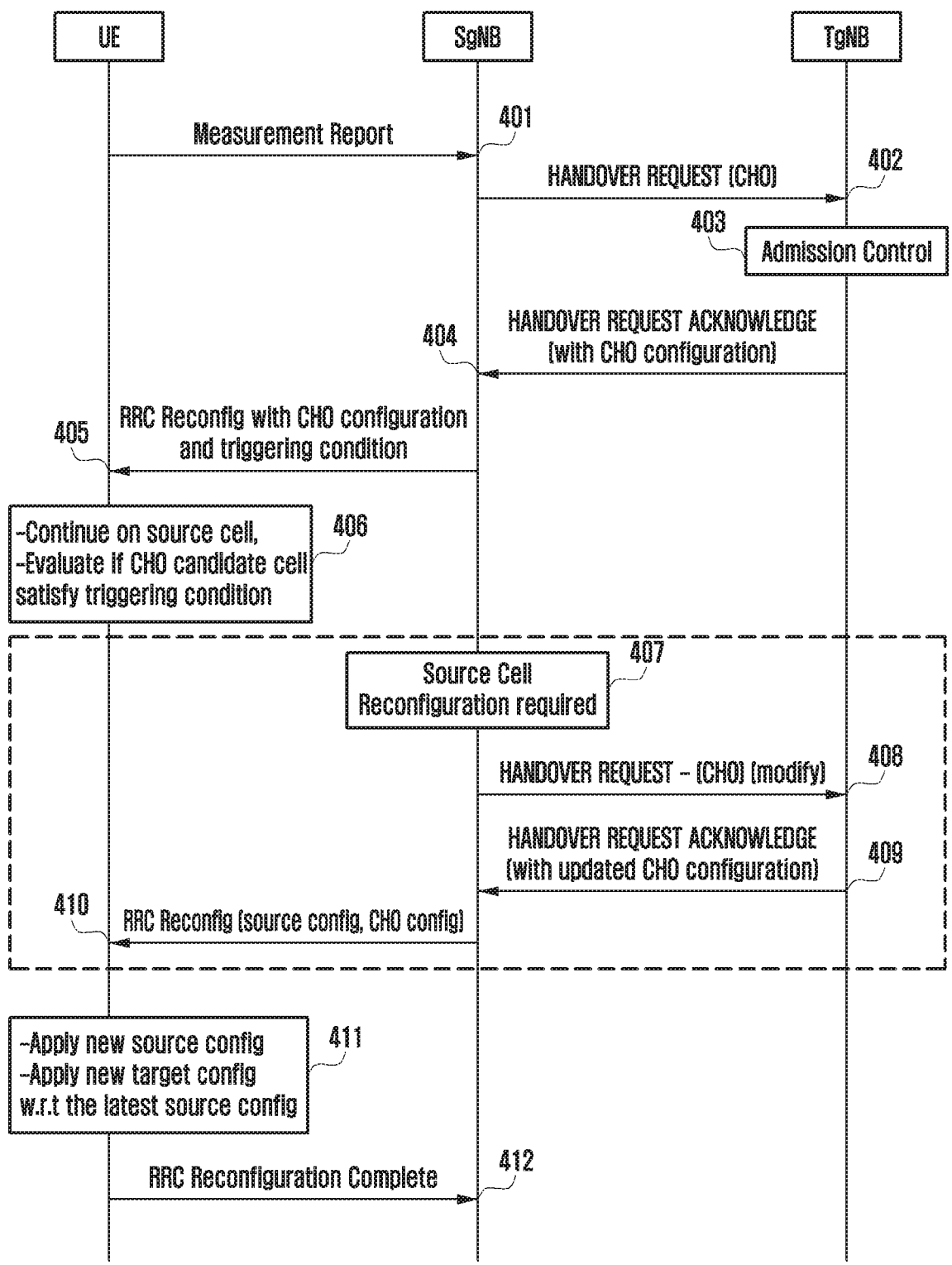
FIG. 4 is a sequence diagram depicting the one-step reconfiguration of the UE, according to embodiments as disclosed herein.

FIG. 4 is a sequence diagram depicting the one step reconfiguration of the UE 102, according to embodiments as disclosed herein. Embodiments herein further explained considering the source and target cells 106 as gNBs for example, but it may be obvious to a person skilled in the art the source and target cells 106 can be any other RAN nodes. The source cell 106 can be referred hereinafter as a SgNB 106 and the target cell 106 can be referred hereinafter as a TgNB 106.

At step 401, the UE 102 sends the measurement report to the SgNB 106, wherein the measurement report includes the measurements of the TgNB 106. On receiving the measurement report from the UE 102, at step 402, the SgNB 106 sends the handover request (CHO) to the TgNB 106. The handover request includes the source cell configuration. On receiving the handover request from the SgNB 106, at step 403, the TgNB 106 performs the admission control and reserves resources for the UE 102. On reserving the resources for the UE 102, the TgNB 106 prepares the CHO target cell configuration. The CHO target cell configuration includes the source cell configuration and the container (including the target cell configuration prepared as delta over the received source cell configuration). At step 404, the TgNB 106 sends the handover request acknowledgment to the SgNB 106, which includes the CHO target cell configuration.

On receiving the CHO target cell configurations from the TgNB 106, at step 405, the SgNB 106 associates the CHO triggering condition with the CHO target cell configurations and sends the CHO configuration of the TgNB 106 to the UE 102 in the RRC reconfiguration message. The CHO configuration of the TgNB 106 includes the CHO target cell configuration and the CHO triggering condition. At step 406, the UE 102 applies the received source cell configuration in the CHO configuration to continue on the source cell. The UE 102 performs the CHO execution, if the CHO triggering condition of the TgNB 106 have been satisfied. The CHO execution involves applying the CHO target cell configuration of the TgNB 106 for the handover.

At step 407, the SgNB 106 reconfigures the source cell configuration. The SgNB 106 may reconfigure the source cell configuration as delta over the existing source cell configuration (the delta source cell configuration). At step 408, the SgNB 106 sends the handover modify request to the TgNB 106, wherein the handover modify request includes the delta source cell configuration. On receiving the delta source cell configuration, at step 409, the TgNB 106 updates the CHO target cell configuration (the delta CHO target cell configuration) by updating the CHO target cell configuration as delta over the delta source cell configuration. The TgNB 106 sends the delta CHO target cell configuration to the SgNB 106 in the handover request acknowledgment.

On receiving the delta CHO target cell configuration, at step 410, the SgNB 106 sends the delta source cell configuration and the delta CHO target cell configuration to the UE 102 in the RRC reconfiguration message. At step 411, the UE 102 updates the CHO configuration of the TgNB 106. The UE 102 initially updates the source cell configuration in the stored CHO configuration (of the CHO configuration) with the delta source configuration. Subsequently, the UE 102 updates the stored CHO target configuration in the CHO configuration of the TgNB 106 with the delta target cell configuration. On updating the CHO configuration of the TgNB 106, at step 412, the UE 102 sends the RRC reconfiguration complete message to the SgNB 106 indicating the successful updating of the CHO configuration of the TgNB 106.

Figure 5:
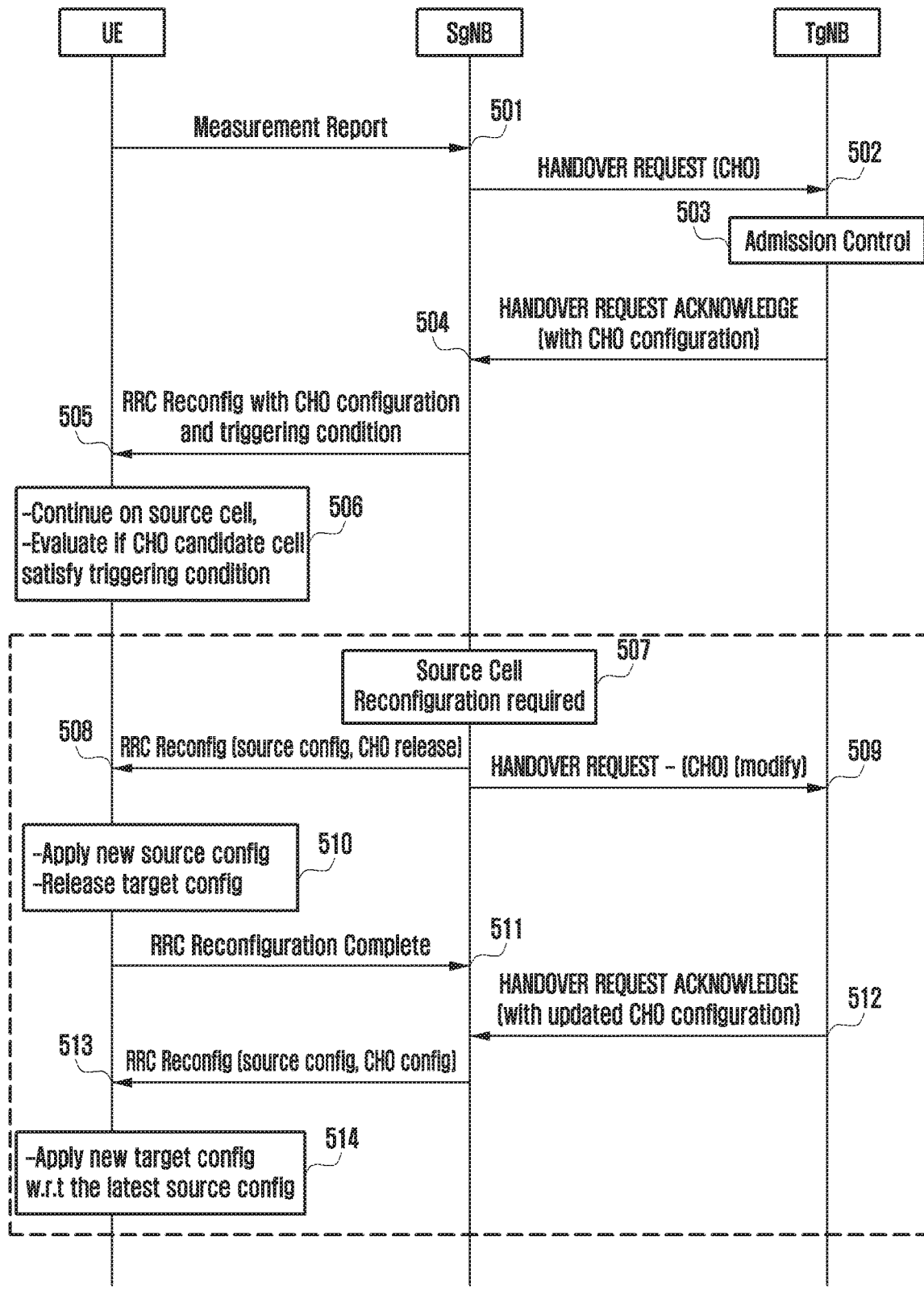
FIG. 5 is an example sequence diagram depicting the two-step reconfiguration of the UE, according to embodiments as disclosed herein.

FIG. 5 is an example sequence diagram depicting the two-step reconfiguration of the UE 102, according to embodiments as disclosed herein.

At step 501, the UE 102 sends the measurement report to the SgNB 106, wherein the measurement report includes the measurements of the TgNB 106. On receiving the measurement report from the UE 102, at step 502, the SgNB 106 sends the handover request (CHO) to the TgNB 106. The handover request includes the source cell configuration. On receiving the handover request from the SgNB 106, at step 503, the TgNB 106 performs the admission control and reserves resources for the UE 102. On reserving the resources for the UE 102, the TgNB 106 prepares the CHO target cell configuration. The CHO target cell configuration includes the source cell configuration and the container (including the target cell configuration prepared as delta over the received source cell configuration). At step 504, the TgNB 106 sends the handover request acknowledgment to the SgNB 106, which includes the CHO target cell configuration.

On receiving the CHO target cell configurations from the TgNB 106, at step 505, the SgNB 106 associates the CHO triggering condition with the CHO target cell configurations and sends the CHO configuration of the TgNB 106 to the UE 102 in the RRC reconfiguration message. The CHO configuration of the TgNB 106 includes the CHO target cell configuration and the CHO triggering condition. At step 506, the UE 102 applies the received source cell configuration in the CHO configuration to continue on the source cell. The UE 102 performs the CHO execution, if the CHO triggering condition of the TgNB 106 have been satisfied. The CHO execution involves applying the CHO target cell configuration of the TgNB 106 for the handover.

At step 507, the SgNB 106 reconfigures the source cell configuration. The SgNB 106 may reconfigure the source cell configuration as delta over the existing source cell configuration (the delta source cell configuration). On reconfiguring the source cell configuration, at step 508, the SgNB 106 sends the first RRC reconfiguration message to the UE 102. The first RRC reconfiguration message includes the delta source cell configuration and a request for releasing the CHO target cell configuration of the TgNB 106 in the CHO configuration. On sending the first RRC reconfiguration message to the UE 102, at step 509, the SgNB 106 sends the handover modify request to the TgNB 106.

On receiving the first RRC reconfiguration message from the SgNB 106, at step 510, the UE 102 updates the source cell configuration in the CHO configuration with the delta source cell configuration and releases the CHO target cell configuration of the TgNB 106. On releasing the CHO target cell configuration of the TgNB 106, at step 511, the UE 102 sends the RRC reconfiguration complete message to the SgNB 106 in response to first RRC reconfiguration message.

On receiving the handover modify request from the SgNB, at step 512, the TgNB 106 updates the CHO target cell configuration and sends the updated/delta CHO target cell configuration to the SgNB 106 in the handover request acknowledgment. The delta CHO target cell configuration can be prepared by updating the CHO target cell configuration as delta over the received delta source cell configuration.

On receiving the delta CHO target cell configuration, at step 513, the SgNB 106 sends the second RRC reconfiguration message to the UE 102. The second RRC reconfiguration message includes the delta CHO target cell configuration. On receiving the second RRC reconfiguration message, at step 514, the UE 102 updates the CHO target cell configuration in the CHO configuration of the TgNB 106 with the received delta CHO target cell configuration.

Figure 6A:
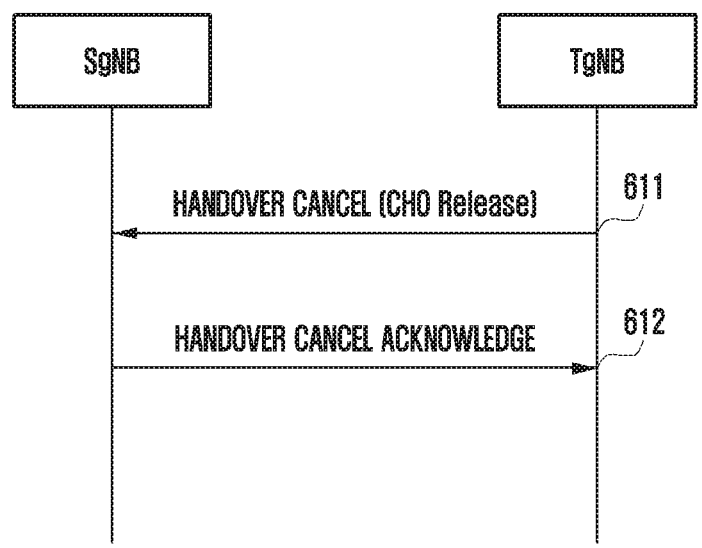
FIGS. 6a, 6b and 6c are example sequence diagrams depicting initiation of release of a Conditional Handover (CHO) target cell configuration by a CHO candidate target cell, when the target cell can no longer serve the UE, according to embodiments as disclosed herein.
Figure 6B:
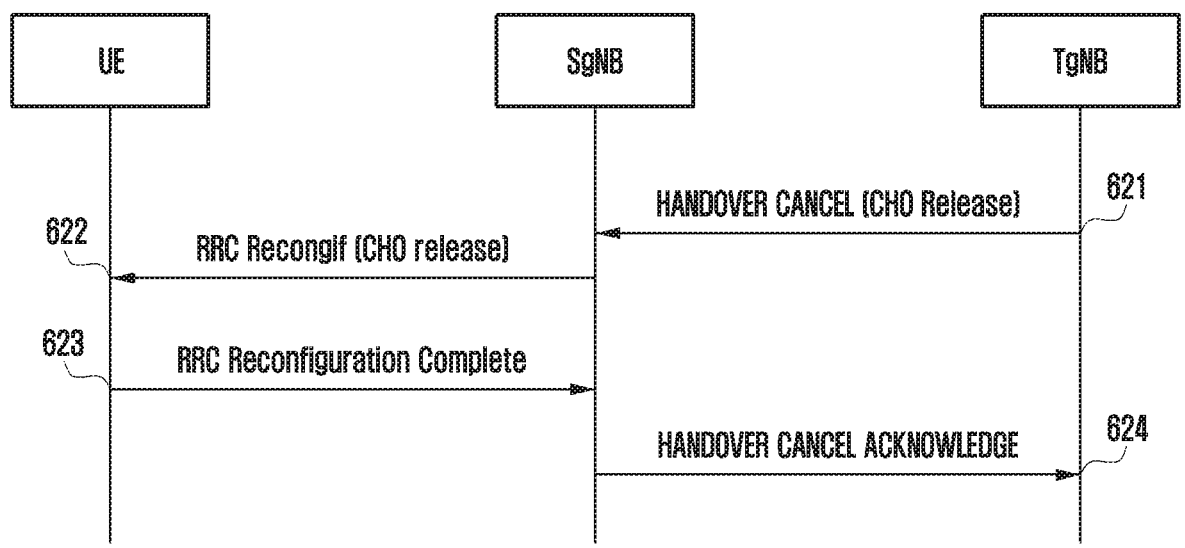
Figure 6C:
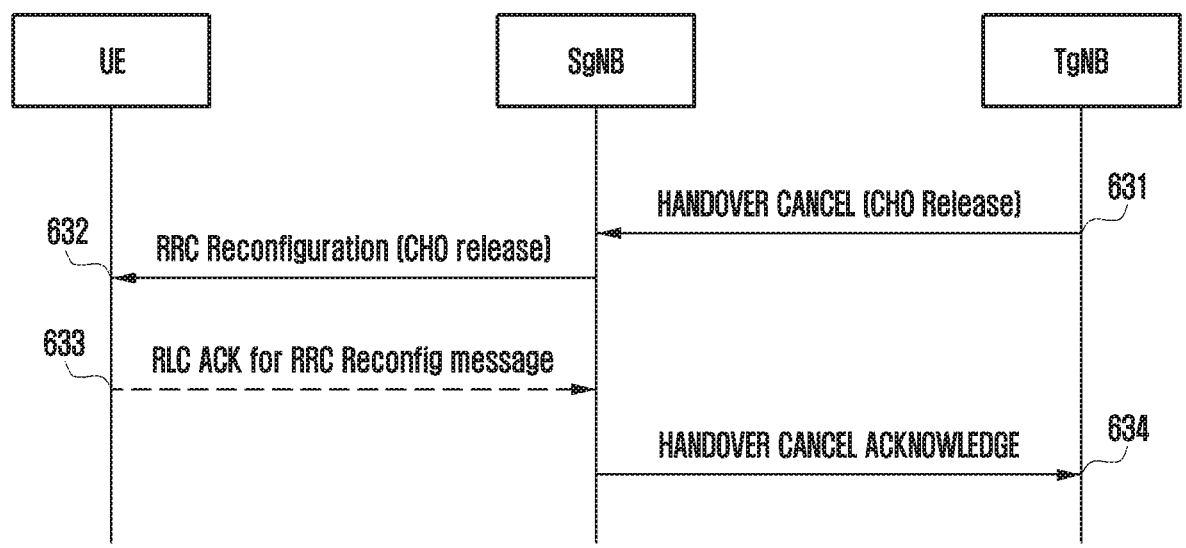

FIGS. 6a, 6b and 6c are example sequence diagrams depicting initiation of the release of the CHO target cell configuration by the CHO candidate target cell 106, when the target cell 106 can no longer serve the UE 102, according to embodiments as disclosed herein.

In an embodiment, as depicted in FIG. 6a, the TgNB 106 initiates the release of the CHO target cell configuration for the UE 102 by sending the handover cancel request to the SgNB 106 and the SgNB 106 accepts the handover cancel request immediately. The TgNB 106 can initiate the release of the CHO target cell configuration for the UE 102, when the TgNB 106 cannot longer serve the UE 102 due to at least one of, allocation of the resources reserved for the UE 102 to another UE 102, increased load on the TgNB, or the like. As depicted in FIG. 6a, at step 611, the TgNB 106 sends the handover cancel request or the CHO configuration release request to the SgNB 106 for allowing the TgNB to release the CHO target cell configuration configured earlier on the UE 102. At step 612, the SgNB 106 accepts the received handover cancel request and sends the handover cancel request acknowledgment to the TgNB 106.

In an embodiment, as depicted in FIG. 6b, the TgNB 106 initiates the release of the CHO target cell configuration for the UE 102 by sending the handover cancel request to the SgNB 106 and the SgNB 106 accepts the handover cancel request, upon successful release of the CHO target cell configuration of the TgNB 106 at the UE 102. As depicted in FIG. 6b, at step 621, the TgNB 106 sends the handover cancel request to the SgNB 106 for allowing the TgNB to release the CHO target cell configuration configured earlier on the UE 102. At step 622, the SgNB 106 sends the RRC reconfiguration message to the UE 102 for releasing the CHO target cell configuration of the TgNB 106. At step 623, the UE 102 releases the CHO target cell configuration of the TgNB 106 and sends the RRC reconfiguration complete message to the SgNB 106 indicating the release of the CHO target cell configuration for the indicated TgNB 106. On receiving the RRC reconfiguration complete message from the UE 102, at step 624, the SgNB 106 accepts the handover cancel request received from the TgNB 106 and sends the handover cancel request acknowledgement to the TgNB 106.

In an embodiment, as depicted in FIG. 6c, the SgNB 106 allows the TgNB 106 to release the CHO target cell configuration earlier provided to the UE 102, on receiving the RLC acknowledgment from the UE 102. As depicted in FIG. 6c, at step 631, the TgNB 106 sends the handover cancel request to the SgNB 106 for allowing the TgNB to release the CHO target cell configuration configured earlier on the UE 102. At step 632, the SgNB 106 sends the RRC reconfiguration message to the UE 102 for releasing the CHO target cell configuration of the TgNB 106. At step 633, the UE 102 releases the CHO target cell configuration of the TgNB 106 and sends the RLC acknowledgment to the SgNB 106 indicating the release of the CHO target cell configuration for the indicated TgNB 106. On receiving the RRC reconfiguration complete message from the UE 102, at step 634, the SgNB 106 accepts the handover cancel request received from the TgNB 106 and sends the handover cancel request acknowledgement to the TgNB 106.

Figure 7:
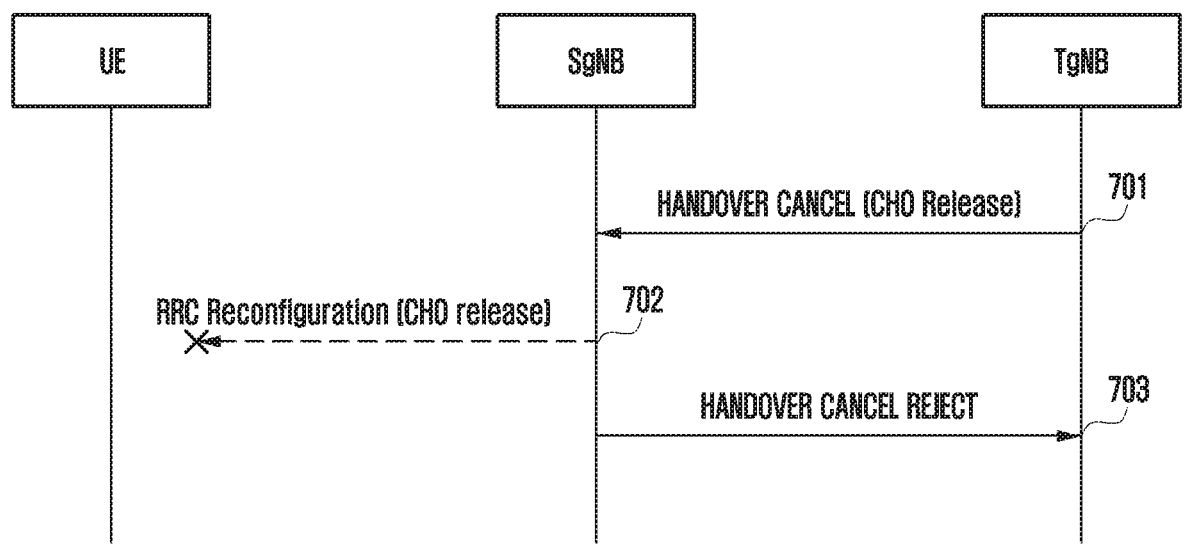
FIG. 7 is an example sequence diagram depicting rejection of the handover cancel request of the CHO candidate target cell, according to embodiments herein as disclosed herein.

FIG. 7 is an example sequence diagram depicting rejection of the handover cancel request of the CHO candidate target cell 106, according to embodiments herein as disclosed herein.

At step 701, the TgNB 106 sends the handover cancel request to the SgNB 106 for allowing the TgNB to release the CHO target cell configuration configured earlier on the UE 102. At step 702, the SgNB 106 sends the RRC reconfiguration message to the UE 102 for releasing the CHO target cell configuration of the TgNB 106 and determines that the UE 102 is unable to receive the RRC reconfiguration message. On determining that the UE 102 is unable to receive the RRC reconfiguration message, at step 703, the SgNB 106 cancels the received handover cancel request of the TgNB 106 and sends the handover cancel reject to the TgNB 106.

Figure 8A:
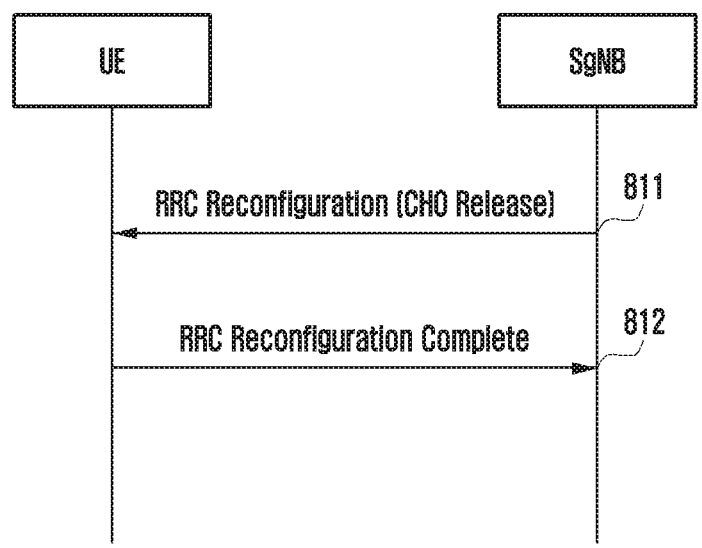
FIGS. 8a, 8b, and 8c are example sequence diagrams depicting example procedures, where Radio Resource Control (RRC) reconfiguration message is sent to the UE to indicate the UE to remove the CHO candidate target cells, according to embodiments as disclosed herein.
Figure 8B:
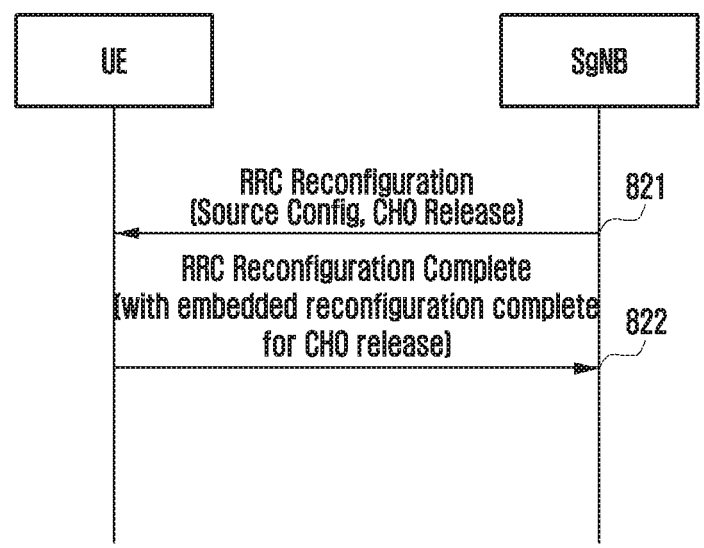
Figure 8C:
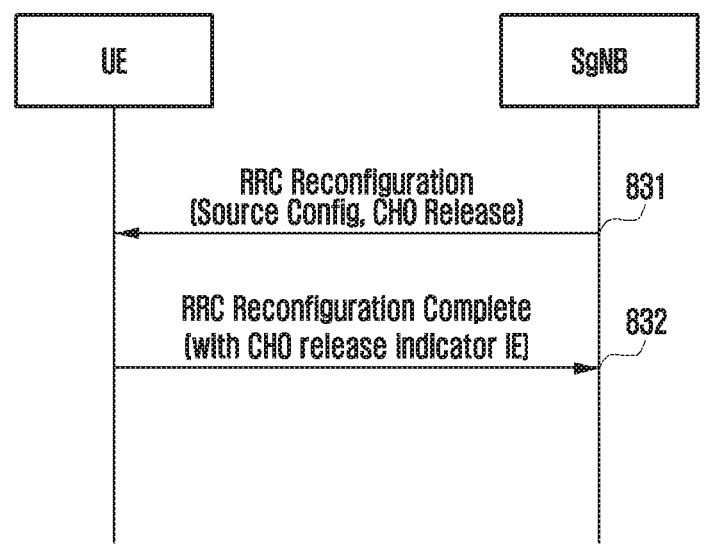

FIGS. 8a, 8b, and 8c are example sequence diagrams depicting example procedures, where the RRC reconfiguration message is sent to the UE 102 to indicate the UE 102 to remove the CHO candidate target cells 106, according to embodiments as disclosed herein.

In an example procedure as depicted in FIG. 8a, at step 811, the SgNB 106 sends the RRC reconfiguration message to the UE 102 for releasing the CHO target cell configuration of the TgNB 106, wherein the RRC reconfiguration message includes the CHO release message. The CHO release message indicates the CHO configuration/CHO target cell configuration of the TgNB, which has to be released. At step 812, the UE 102 releases the CHO target cell configuration of the TgNB 106 and sends the RRC reconfiguration complete message to the SgNB 106.

In another example procedure, as depicted in FIG. 8b, at step 821, the SgNB 106 sends the RRC reconfiguration message to the UE 102 for releasing the CHO target cell configuration of the TgNB 106, wherein the RRC reconfiguration message includes the source cell configuration and the CHO release message. At step 822, the UE 102 releases the CHO target cell configuration of the TgNB 106 and sends the joint/combined RRC reconfiguration complete message to the SgNB 106. The combined RRC reconfiguration complete message includes the reconfiguration complete message for the updated/delta source cell configurations and the embedded reconfiguration complete message for indicating the release of the CHO target cell configuration of the TgNB 106.

In another example procedure, as depicted in FIG. 8c, at step 831, the SgNB 106 sends the RRC reconfiguration message to the UE 102 for releasing the CHO target cell configuration of the TgNB 106, wherein the RRC reconfiguration message includes the source cell configuration and the CHO release message. At step 832, the UE 102 releases the CHO target cell configuration of the TgNB 106 and sends the RRC reconfiguration complete message to the SgNB 106. The RRC reconfiguration complete message includes the CHO release indicator (IE), which indicates the successful release of the CHO target cell configuration of the indicated TgNB 106.

Figure 9A:
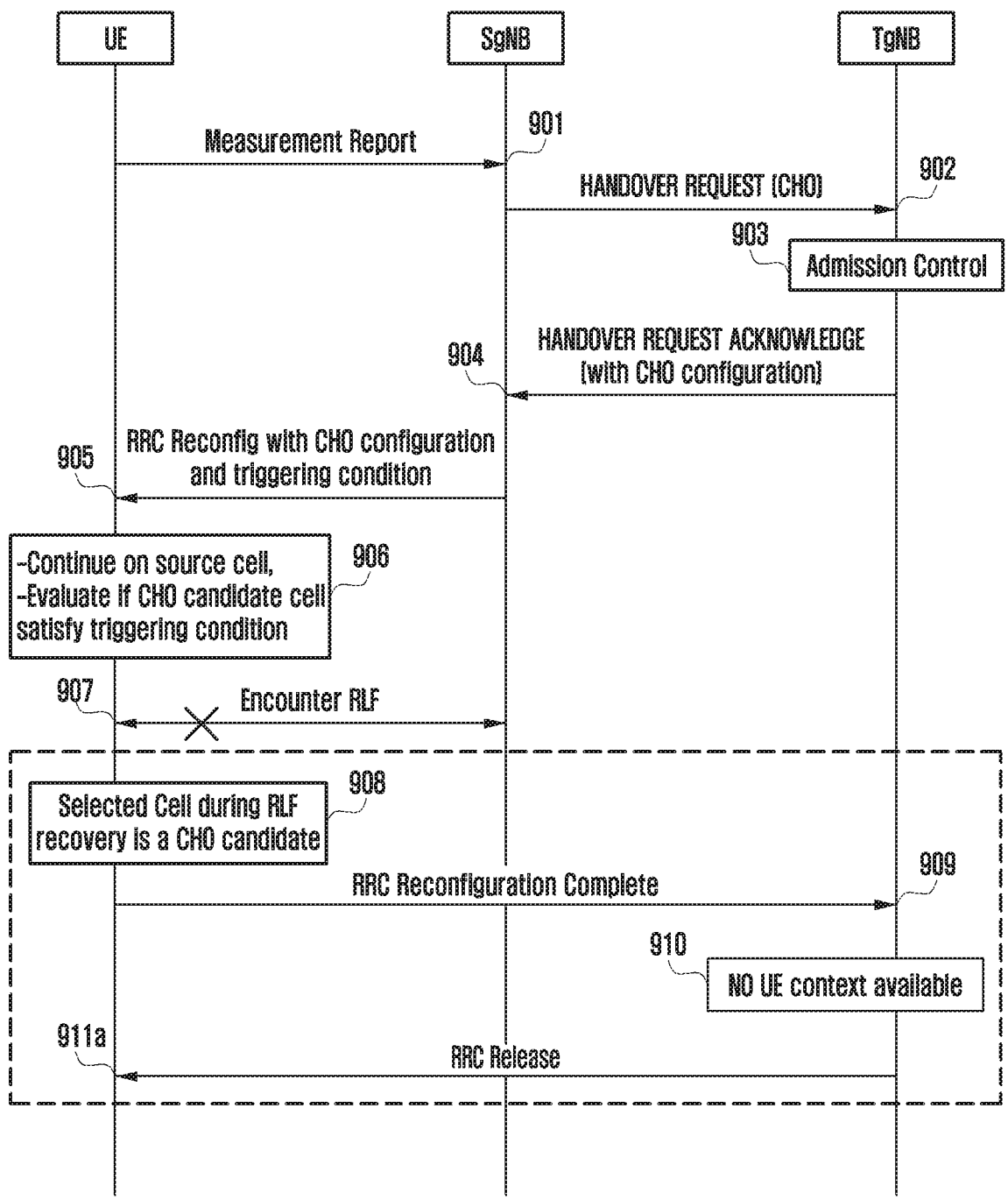
FIGS. 9a and 9b are example diagrams depicting a fall-back to connection setup procedure following at least one failure encountered by the UE on the source cell, according to embodiments as disclosed herein.
Figure 9B:
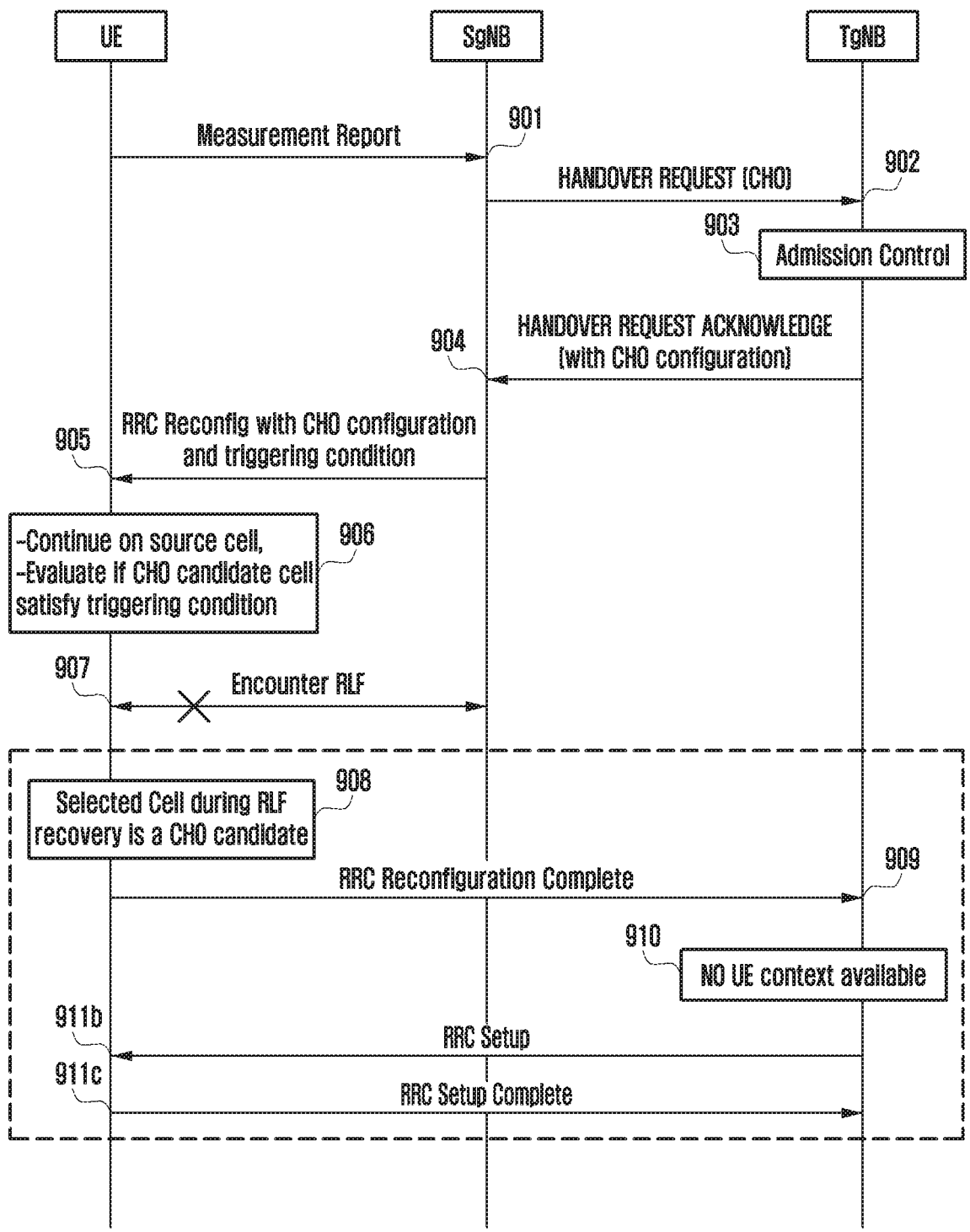

FIGS. 9a and 9b are example diagrams depicting the fall-back to connection setup procedure following the at least one failure encountered by the UE 102 on the source cell 106, according to embodiments as disclosed herein.

As depicted in FIGS. 9a and 9b, at step 901, the UE 102 sends the measurement report to the SgNB 106, wherein the measurement report includes the measurements of the TgNB 106. On receiving the measurement report from the UE 102, at step 902, the SgNB 106 sends the handover request (CHO) to the TgNB 106. The handover request includes the source cell configuration. On receiving the handover request from the SgNB 106, at step 903, the TgNB 106 performs the admission control and reserves resources for the UE 102. On reserving the resources for the UE 102, the TgNB 106 prepares the CHO target cell configuration. The CHO target cell configuration includes the source cell configuration and the container (including the target cell configuration prepared as delta over the received source cell configuration). At step 904, the TgNB 106 sends the handover request acknowledgment to the SgNB 106, which includes the CHO target cell configuration.

On receiving the CHO target cell configurations from the TgNB 106, at step 905, the SgNB 106 associates the CHO triggering condition with the CHO target cell configurations and sends the CHO configuration of the TgNB 106 to the UE 102 in the RRC reconfiguration message. The CHO configuration of the TgNB 106 includes the CHO target cell configuration and the CHO triggering condition. At step 906, the UE 102 applies the received source cell configuration in the CHO configuration to continue on the source cell. The UE 102 performs the CHO execution, if the CHO triggering condition of the TgNB 106 have been satisfied. The CHO execution involves applying the CHO target cell configuration of the TgNB 106 for the handover.

At step 907, the UE 102 encounter with the at least on failure (for example: the RLF) on the SgNB 106. On encountering with the at least one failure, at step 908, the UE 102 performs the cell selection procedure and selects the gNB present in proximity to the UE 102, wherein the selected gNB can be the CHO candidate target cell/TgNB 106. At step 909, the UE 102 sends the RRC reconfiguration complete message to the TgNB 106. At step 910, the TgNB 106 considers the received RRC reconfiguration complete message as the unexpected RRC reconfiguration complete message, since the TgNB 106 does not have the UE context.

In an embodiment as depicted in FIG. 9a, on receiving the unexpected RRC reconfiguration message, at step 911a, the TgNB 106 sends the RRC release message to the UE 102. On receiving the RRC release message, the UE 102 may initiate the RRC connection setup procedure.

In an embodiment as depicted in FIG. 9b, on receiving the unexpected RRC reconfiguration message, at step 911b, the TgNB 106 sends the RRC setup message to the UE 102, wherein the RRC setup message includes the configurations of the TgNB 106. On receiving the RRC setup message, at step 911c, the UE 102 applies the configurations of the TgNB 106 in the received RRC setup message and sends the RRC setup complete message to the TgNB 106.

Figure 10A:
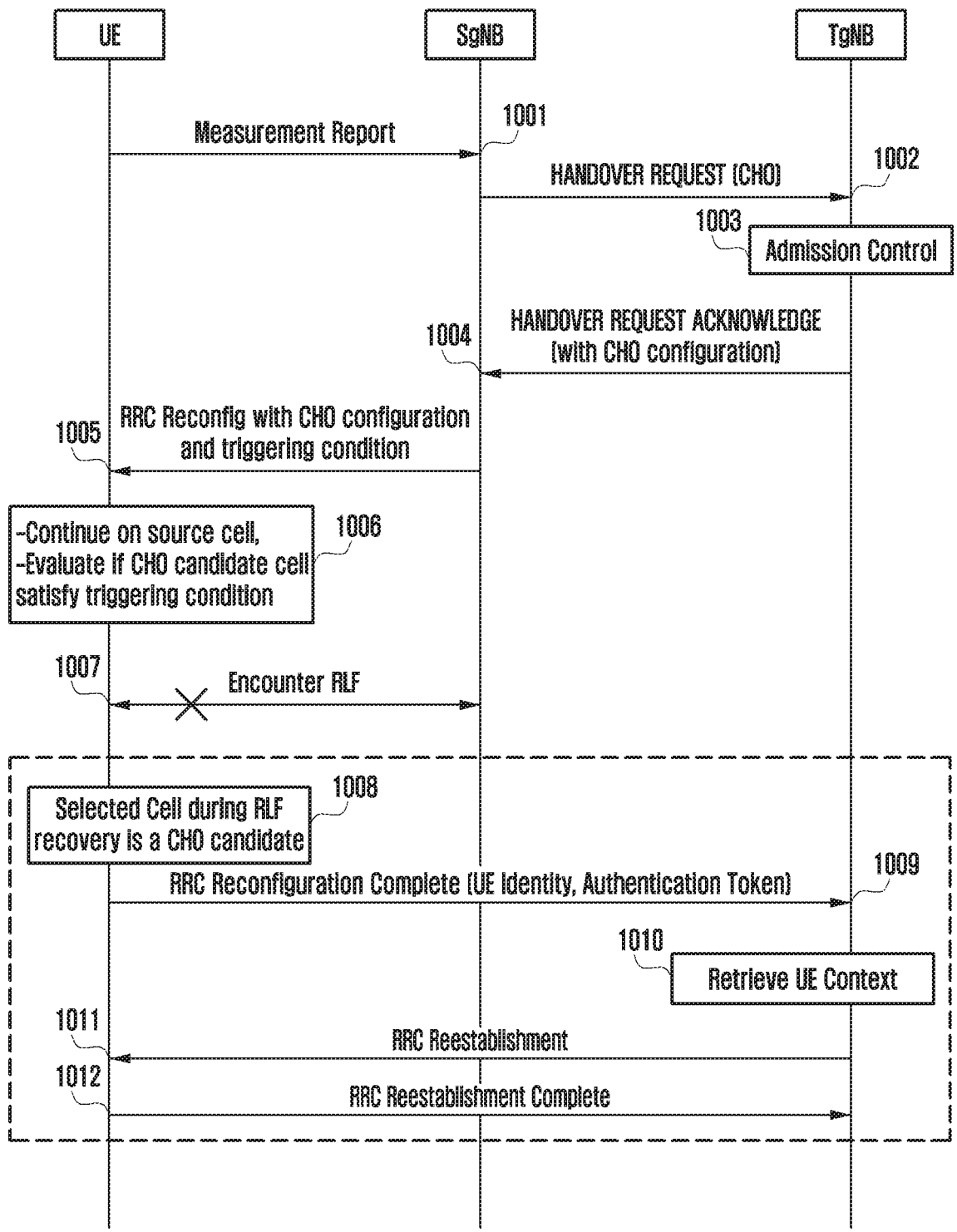
FIG. 10a is an example sequence diagram depicting a fall-back procedure to a connection reestablishment, following the at least one failure encountered by the UE on the source cell, according to embodiments as disclosed herein, according to embodiments as disclosed herein.

FIG. 10a is an example sequence diagram depicting a fall-back procedure to the connection reestablishment, following the at least one failure encountered by the UE 102 on the source cell 106, according to embodiments as disclosed herein, according to embodiments as disclosed herein.

At step 1001, the UE 102 sends the measurement report to the SgNB 106, wherein the measurement report includes the measurements of the TgNB 106. On receiving the measurement report from the UE 102, at step 1002, the SgNB 106 sends the handover request (CHO) to the TgNB 106. The handover request includes the source cell configuration. On receiving the handover request from the SgNB 106, at step 1003, the TgNB 106 performs the admission control and reserves resources for the UE 102. On reserving the resources for the UE 102, the TgNB 106 prepares the CHO target cell configuration. The CHO target cell configuration includes the source cell configuration and the container (including the target cell configuration prepared as delta over the received source cell configuration). At step 1004, the TgNB 106 sends the handover request acknowledgment to the SgNB 106, which includes the CHO target cell configuration.

On receiving the CHO target cell configurations from the TgNB 106, at step 1005, the SgNB 106 associates the CHO triggering condition with the CHO target cell configurations and sends the CHO configuration of the TgNB 106 to the UE 102 in the RRC reconfiguration message. The CHO configuration of the TgNB 106 includes the CHO target cell configuration and the CHO triggering condition. At step 1006, the UE 102 applies the received source cell configuration in the CHO configuration to continue on the source cell. The UE 102 performs the CHO execution, if the CHO triggering condition of the TgNB 106 have been satisfied. The CHO execution involves applying the CHO target cell configuration of the TgNB 106 for the handover.

At step 1007, the UE 102 encounter with the at least on failure (for example: the RLF) on the SgNB 106. On encountering with the at least one failure, at step 1008, the UE 102 performs the cell selection procedure and selects the gNB present in proximity to the UE 102, wherein the selected gNB can be the CHO candidate target cell/TgNB 106. At step 1009, the UE 102 sends the RRC reconfiguration complete message to the TgNB 106, wherein the RRC reconfiguration complete message includes the information about the old SgNB 106 (the gNB which was being served as the source cell 106 for the UE 102 before encountering the at least one failure). The information about the old SgNB 106 includes information about the identity of the old SgNB 106, and the authentication token of the old SgNB 106. An example RRC reconfiguration complete message including the information about the old source cell is depicted in FIG. 10b.

On receiving the RRC reconfiguration message including the information about the old SgNB 106, at step 1010, the TgNB 106 requests the old SgNB 106 and retrieves the UE context. On retrieving the UE context, at step 1011, the TgNB 106 sends signaling to the UE 102 to perform the RRC re-establishment. An example signaling indicating the UE 102 to perform the RRC re-establishment, on encountering the at least one failure is depicted in FIG. 10c. At step 1012, the UE 102 performs the RRC re-establishment and sends the RRC re-establishment complete to the TgNB 106.

Figure 11:
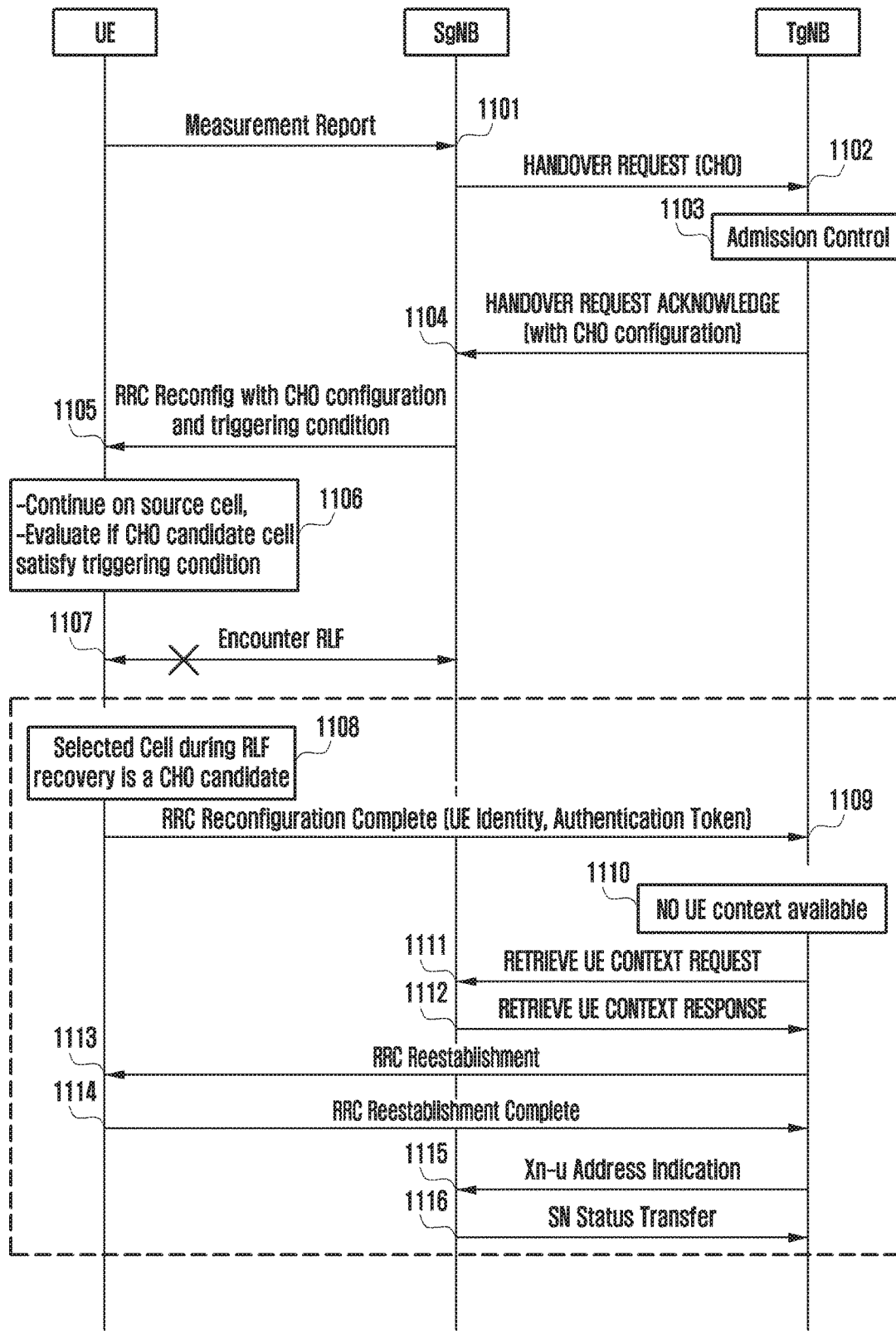
FIG. 11 is an example sequence diagram depicting retrieving of Sequence Number (SN) status transfer by the CHO candidate target cell to serve the UE, following the at least one failure encountered by the UE on the source cell, according to embodiments as disclosed herein, according to embodiments as disclosed herein.

FIG. 11 is an example sequence diagram depicting retrieving of the SN status transfer by the CHO candidate target cell 106 to serve the UE 102, following the at least one failure encountered by the UE 102 on the source cell 106, according to embodiments as disclosed herein, according to embodiments as disclosed herein.

At step 1101, the UE 102 sends the measurement report to the SgNB 106, wherein the measurement report includes the measurements of the TgNB 106. On receiving the measurement report from the UE 102, at step 1102, the SgNB 106 sends the handover request (CHO) to the TgNB 106. The handover request includes the source cell configuration. On receiving the handover request from the SgNB 106, at step 1103, the TgNB 106 performs the admission control and reserves resources for the UE 102. On reserving the resources for the UE 102, the TgNB 106 prepares the CHO target cell configuration. The CHO target cell configuration includes the source cell configuration and the container (including the target cell configuration prepared as delta over the received source cell configuration). At step 1104, the TgNB 106 sends the handover request acknowledgment to the SgNB 106, which includes the CHO target cell configuration.

On receiving the CHO target cell configurations from the TgNB 106, at step 1105, the SgNB 106 associates the CHO triggering condition with the CHO target cell configurations and sends the CHO configuration of the TgNB 106 to the UE 102 in the RRC reconfiguration message. The CHO configuration of the TgNB 106 includes the CHO target cell configuration and the CHO triggering condition. At step 1106, the UE 102 applies the received source cell configuration in the CHO configuration to continue on the source cell. The UE 102 performs the CHO execution, if the CHO triggering condition of the TgNB 106 have been satisfied. The CHO execution involves applying the CHO target cell configuration of the TgNB 106 for the handover.

At step 1107, the UE 102 encounter with the at least on failure (for example: the RLF) on the SgNB 106. On encountering with the at least one failure, at step 1108, the UE 102 performs the cell selection procedure and selects the gNB present in proximity to the UE 102, wherein the selected gNB can be the CHO candidate target cell/TgNB 106. At step 1109, the UE 102 sends the RRC reconfiguration complete message to the TgNB 106, wherein the RRC reconfiguration complete message includes the information about the old SgNB 106 (the gNB which was being served as the source cell 106 for the UE 102 before encountering the at least one failure). The information about the old SgNB 106 includes information about the identity of the old SgNB 106, and the authentication token of the old SgNB 106. On receiving the RRC reconfiguration message including the information about the old SgNB 106, at step 1110, the TgNB 106 determines that the TgNB 106 does not have the UE context. At step 1111, the TgNB 106 identifies the old SgNB 106 from the received RRC reconfiguration message from the UE 102 and sends the Retrieve UE context to the old SgNB 106 for the UE context. At step 1112, the old SgNB 106 sends the Retrieve UE context response including the UE context to the TgNB 106.

On receiving the UE context from the old SgNB 106, at step 1113, the TgNB 106 sends the RRC re-establishment message to the UE 102. On receiving the RRC re-establishment message, at step 1114, the UE 102 sends the RRC re-establishment complete message to the TgNB 106. At step 1115, the TgNB 106 sends the Xn-U address indication to the old SgNB 106 for the SN status transfer. At step 1116, the old SgNB 106 sends the SN status transfer to the TgNB 106, so that the TgNB 106 can resume the data transfer to the UE 102, which has been ongoing prior to the at least one failure encountered by the UE 102.

Figure 12A:
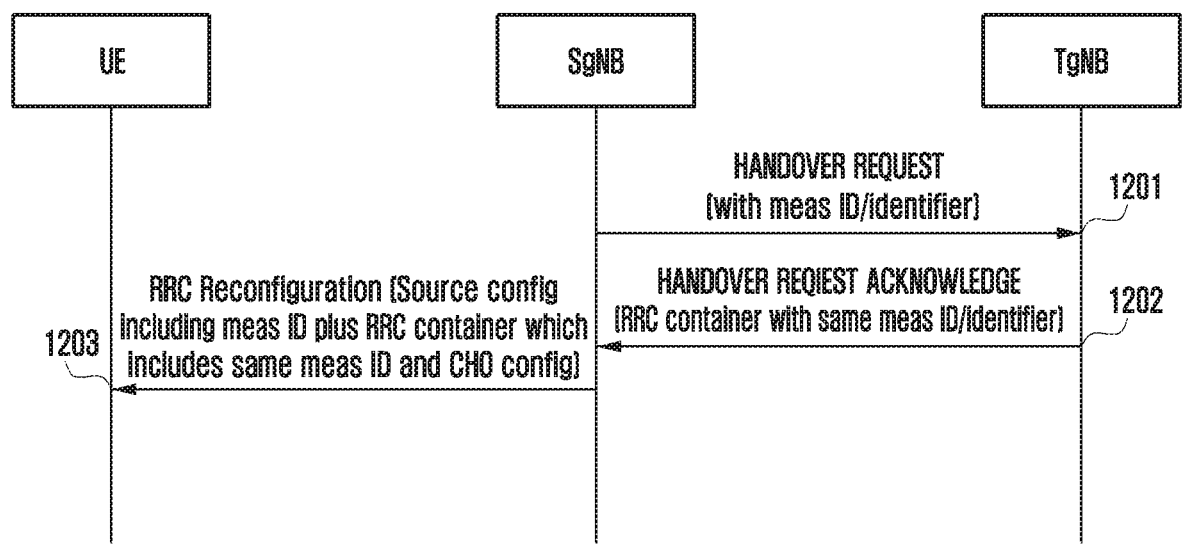
FIG. 12a is an example sequence diagram depicting the association of a CHO triggering condition with the CHO target cell configuration of the CHO candidate target cell, according to embodiments as disclosed herein.

FIG. 12a is an example sequence diagram depicting the association of the CHO triggering condition with the CHO target cell configuration of the CHO candidate target cell 106, according to embodiments as disclosed herein.

Embodiments herein enable the SgNB 106 to associate the CHO triggering condition(s) with the CHO target cell configuration(s) of the TgNB(s) 106 during the CHO preparation for the UE 102. The CHO triggering condition may include the measurement object and the report configuration. The SgNB 106 links the measurement object and the report configuration using the measurement identifier or any other unique ID. The SgNB 106 further enables the TgNB 106 to include the measurement identifier in the container of its CHO target cell configuration.

As depicted in FIG. 12a, at step 1201, the SgNB 106 sends the handover request to the TgNB 106. The handover request includes the source cell configuration and the measurement identifier. On receiving the handover request, at step 1202, the TgNB 106 prepares the CHO target cell configuration and sends the CHO target cell configuration to the SgNB 106 in the handover request acknowledgment. The CHO target cell configuration includes the source cell configuration and the RRC container, wherein the RRC container includes the target cell configuration prepared as delta over the source cell configuration and the measurement identifier.

On receiving the CHO target cell configuration, at step 1203, the SgNB 106 prepares the CHO configuration of the TgNB 106 by associating the CHO triggering condition with the CHO target cell configuration and sends the CHO configuration of the TgNB 106 to the UE 102 in the RRC reconfiguration message. The UE 102 stores the CHO configuration of the TgNB 106 in the CHO candidate target cell list (which has been stored in the memory 202).

As depicted in FIG. 12b, the CHO configuration of the TgNB 106 in the RRC reconfiguration message includes the CHO target cell configuration, the measurement object, the report configuration, measurement identified, or the like. The CHO target cell configuration includes the source cell configuration and the container, wherein the RRC container includes the target cell configuration prepared as delta over the source cell configuration and the measurement identifier.

The embodiments disclosed herein can be implemented through at least one software program running on at least one hardware device and performing network management functions to control the elements. The elements shown in FIGS. 1-12a can be at least one of a hardware device, or a combination of hardware device and software module.

The embodiments disclosed herein describe methods and systems for managing Conditional Handover (CHO) in a wireless communication network. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method performed by a source base station (BS) in a wireless communication system, the method comprising:
   transmitting, to a candidate target BS, a handover request message for a terminal, the handover request message including source cell configuration information;
   receiving, from the candidate target BS, a handover request acknowledge message including first conditional handover (CHO) configuration information corresponding to the source cell configuration information;
   transmitting, to the terminal, a first radio resource control (RRC) message including the first CHO configuration information based on the handover request acknowledge message; and
   transmitting, to the terminal, a second RRC message for configuring updated source cell configuration information of the source BS,
   wherein the first CHO configuration information is released based on the second RRC message.

2. The method of claim 1, further comprising:
   transmitting, to the candidate target BS, a handover request message including the updated source cell configuration information;
   receiving, from the candidate target BS, a handover request acknowledge message including second CHO configuration information corresponding to the updated source cell configuration information; and
   transmitting, to the terminal, a third RRC message including the second CHO configuration information,
   wherein the terminal executes the CHO to the candidate target BS in case that a triggering condition for the CHO based on the second CHO configuration information is fulfilled.

3. The method of claim 1, further comprising:
   transmitting, to the terminal, a fourth RRC message indicating to the terminal to enter an RRC inactive state,
   wherein stored CHO configuration information is released based on the fourth RRC message.

4. The method of claim 1, further comprising:
   receiving, from the candidate target BS, a CHO cancel message; and
   transmitting, to the terminal, a fifth RRC message for releasing stored CHO configuration information based on the CHO cancel message,
   wherein the stored CHO configuration information is released based on the fifth RRC message.

5. A method performed by a candidate target base station (BS) in a wireless communication system, the method comprising:
   receiving, from a source BS, a handover request message for a terminal, the handover request message including source cell configuration information;
   transmitting, to the source BS, a handover request acknowledge message including first conditional handover (CHO) configuration information corresponding to the source cell configuration information;
   receiving, from the source BS, a handover request message including updated source cell configuration information of the source BS;
   transmitting, to the source BS, a handover request acknowledge message including second CHO configuration information corresponding to the updated source cell configuration information; and
   receiving, from the terminal, a message for an execution of CHO to the candidate target BS—in case that a triggering condition for the CHO based on the second CHO configuration information is fulfilled,
   wherein the first CHO configuration information is released based on the updated source cell configuration information of the source BS.

6. The method of claim 5, further comprising:
   transmitting, to the source BS, a CHO cancel message,
   wherein stored CHO configuration information is released based on a RRC message from the source BS, and
   wherein the RRC message is transmitted to the terminal for releasing the stored CHO configuration information based on the CHO cancel message.

7. A method performed by a terminal in a wireless communication system, the method comprising:
   receiving, from a source base station (BS), a first radio resource control (RRC) message including a first conditional handover (CHO) configuration information for the terminal to a candidate target BS, the first CHO configuration information corresponding to a source cell configuration information;
   releasing the first CHO configuration information, in case of receiving, from the source BS, a second RRC message for configuring updated source cell configuration information of the source BS;
   receiving, from the source BS, a third RRC message including a second CHO configuration information;
   determining whether a triggering condition for CHO is fulfilled for the candidate target BS based on the second CHO configuration information; and
   executing the CHO to the candidate target BS in case that the triggering condition is fulfilled.

8. The method of claim 7, further comprising:
   receiving, from the source BS, a fourth RRC message indicating the terminal to enter an RRC inactive state; and
   releasing stored CHO configuration information based on the fourth RRC message.

9. A source base station (BS) in a wireless communication system, the source BS comprising:
   a transceiver configured to transmit and receive a signal; and
   a controller coupled with the transceiver and configured to:

transmit, to a candidate target BS, a handover request message for a terminal, the handover request message including source cell configuration information, receive, from the candidate target BS, a handover request acknowledge message including first conditional handover (CHO) configuration information corresponding to the source cell configuration information, transmit, to the terminal, a first radio resource control (RRC) message including the first CHO configuration information based on the handover request acknowledge message, and transmit, to the terminal, a second RRC message for configuring updated source cell configuration information of the source BS, wherein the first CHO configuration information is released based on the second RRC message.

10. The source BS of claim 9, wherein the controller is further configured to:
 transmit, to the candidate target BS, a handover request message including the updated source cell configuration information,
 receive, from the candidate target BS, a handover request acknowledge message including second CHO configuration information corresponding to the updated source cell configuration information, and
 transmit, to the terminal, a third RRC message including the second CHO configuration information, and wherein the terminal executes the CHO to the candidate target BS in case that a triggering condition for the CHO based on the second CHO configuration information is fulfilled.

11. The source BS of claim 9, wherein the controller is further configured to transmit, to the terminal, a fourth RRC message indicating to the terminal to enter an RRC inactive state, and wherein stored CHO configuration information is released based on the fourth RRC message.

12. The source BS of claim 9, wherein the controller is further configured to:
 receive, from the candidate target BS, a CHO cancel message; and
 transmit, to the terminal, a fifth RRC message for releasing stored CHO configuration information based on the CHO cancel message, and wherein the stored CHO configuration information is released based on the fifth RRC message.

13. A candidate target base station (BS) in a wireless communication system, the candidate target BS comprising:

a transceiver configured to transmit and receive a signal; and a controller coupled with the transceiver and configured to:
 receive, from a source BS, a handover request message for a terminal, the handover request message including source cell configuration information,
 transmit, to the source BS, a handover request acknowledge message including first conditional handover (CHO) configuration information corresponding to the source cell configuration information,
 receive, from the source BS, a handover request message including updated source cell configuration information of the source BS,
 transmit, to the source BS, a handover request acknowledge message including second CHO configuration information corresponding to the updated source cell configuration information, and
 receive, from the terminal, a message for an execution of CHO to the candidate target BS in case that a triggering condition for the CHO based on the second CHO configuration information is fulfilled, wherein the first CHO configuration information is released based on the updated source cell configuration information of the source BS.

14. The candidate target BS of claim 13, wherein the controller is further configured to transmit, to the source BS, a CHO cancel message, wherein stored CHO configuration information is released based on a RRC message from the source BS, and wherein the RRC message is transmitted to the terminal for releasing the stored CHO configuration information based on the CHO cancel message.

15. A terminal in a wireless communication system, the terminal comprising:

a transceiver configured to transmit and receive a signal; and a controller coupled with the transceiver and configured to:
 receive, from a source base station (BS), a first radio resource control (RRC) message including a first conditional handover (CHO) configuration information for the terminal to a candidate target BS, the first CHO configuration information corresponding to a source cell configuration information,
 release the first CHO configuration information, in case of receiving, from the source BS, a second RRC message for configuring updated source cell configuration information of the source BS,
 receive, from the source BS, a third RRC message including a second CHO configuration information,
 determine whether a triggering condition for CHO is fulfilled for the candidate target BS based on the second CHO configuration information, and
 execute the CHO to the candidate target BS in case that the triggering condition is fulfilled.

16. The terminal of claim 15, wherein the controller is further configured to:
 receive, from the source BS, a fourth RRC message indicating the terminal to enter an RRC inactive state, and
 release stored CHO configuration information based on the fourth RRC message.

* * * * *